United States Patent
Ulczynski et al.

(10) Patent No.: US 6,182,904 B1
(45) Date of Patent: *Feb. 6, 2001

(54) AUTOMATED ELECTRONICALLY CONTROLLED MICROSPRAYER

(75) Inventors: Michael J. Ulczynski, Riverview; Brian L. Wright, Mason; James Ray Miller, Williamston, all of MI (US)

(73) Assignee: Board of Trustees operating Michigan State University, East Lansing, MI (US)

( * ) Notice: Under 35 U.S.C. 154(b), the term of this patent shall be extended for 0 days.

This patent is subject to a terminal disclaimer.

(21) Appl. No.: 09/415,509

(22) Filed: Oct. 8, 1999

Related U.S. Application Data

(63) Continuation-in-part of application No. 08/841,429, filed on Apr. 22, 1997, now Pat. No. 5,964,403.

(51) Int. Cl.⁷ .................... B05B 17/00; A01G 27/00
(52) U.S. Cl. .................. 239/1; 239/69; 239/70; 239/373; 239/584; 239/600; 222/399; 222/646
(58) Field of Search ................... 239/1, 69, 273, 239/373, 584, 70, 600, DIG. 15, 585.1; 222/399, 646, 649; 251/129.09, 129.15, 129.21

(56) References Cited

U.S. PATENT DOCUMENTS

| | | |
|---|---|---|
| 2,289,310 | 7/1942 | Steel . |
| 3,305,134 | 2/1967 | Carmichael et al. . |
| 3,523,646 | 8/1970 | Waldrum . |
| 4,272,019 | 6/1981 | Halaby, Jr. . |
| 4,473,186 | 9/1984 | Alperin . |
| 4,671,435 | 6/1987 | Stout et al. . |
| 4,852,802 | 8/1989 | Iggulden et al. . |
| 4,909,439 | 3/1990 | Fu . |
| 4,962,522 | 10/1990 | Marian . |
| 5,048,755 | 9/1991 | Dodds . |
| 5,074,443 | 12/1991 | Fugii et al. . |
| 5,232,167 | 8/1993 | McCormick et al. . |
| 5,244,180 | 9/1993 | Wakeman et al. . |
| 5,289,627 | 3/1994 | Cerny et al. . |
| 5,476,226 | 12/1995 | Tomiita et al. . |
| 5,483,944 | 1/1996 | Leighton et al. . |
| 5,570,813 | 11/1996 | Clark, II . |
| 5,601,263 | * 2/1997 | Thayer ........................ 239/273 X |
| 5,964,403 | * 10/1999 | Miller et al. ........................ 239/1 |

FOREIGN PATENT DOCUMENTS 0 220 332   5/1987   (EP) .

OTHER PUBLICATIONS

Baker, T.C. et al., J. Agric Entomol. 14: 449–457(1997).
Cardé, R. T. et al., Annu. Rev Entomol. 40:559–585(1995).
Fadamiro, H.Y. et al., J. Agric Entomol 15: 377–386 (1998).
Millar, J.G. J. Econ. Entomol. 88: pp. 1425–1432 (1995).

(List continued on next page.)

*Primary Examiner*—Andres Kashnikow
*Assistant Examiner*—Steven J. Ganey
(74) *Attorney, Agent, or Firm*—Ian C. McLeod; Mary M. Moyne

(57) ABSTRACT

An electronically controlled micro-dispensing apparatus (10) is described. The apparatus includes a container (12), an adaptor (18), a nozzle (28) and a control circuit (34 or 42). The container is filled with the chemical (104) and propellant (102). The adaptor, nozzle and control circuit are removable from the container and are reusable. The control circuits controls the length of pulse and the time duration between each pulse. By controlling these factors, the apparatus dispenses a precise amount of liquid over a set time period. The ejector allows for controlled dispensing and allows the liquid to be sprayed a greater distance. In the preferred embodiment, the apparatus are used to dispense a pheromone in an outdoor setting, such as an orchard (100), to control insects.

43 Claims, 14 Drawing Sheets

OTHER PUBLICATIONS

Shorey, H.H. et al., Environ. Entomol. 23: pp. 1529–1533 (1994).

Shorey, H.H. et al., Environ. Entomol. 25: pp. 1154–1157 (1996a).

Shorey, H.H. et al., Environ. Entomol. 25: pp. 1398–1400 (1996b).

Shorey. H.H. et al., Environ. Entomol. 25: pp. 446–451 (1996).

Vickers, R.A., and G.H.L. Rothschild. 1991. Use of Sex For Control of Codling Moth, pp. 339–354. IN L.P.S. vander-Geest and H.H. Evenhuis (eds.), Tortricid moths: their biology, natural enemies and control. Elsevier, Amsterdam.

McDonough, L.M. et al., J. Chem. Ecol. 18: pp. 2177–2189 (1992).

Mafra–Neto, A., and T. C. Baker J. Agric. Entomol. 13: pp. 149–168 (1996).

* cited by examiner

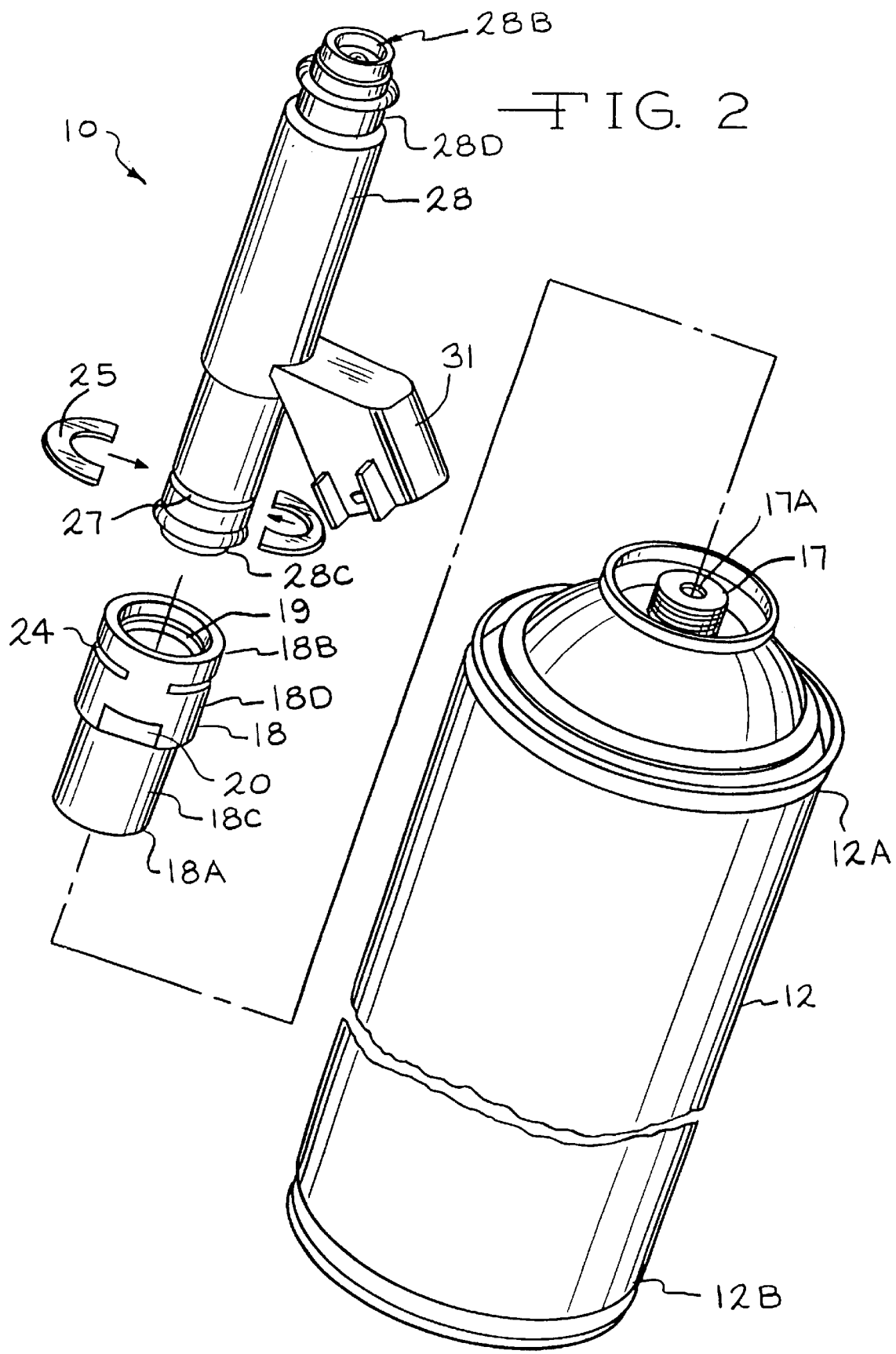

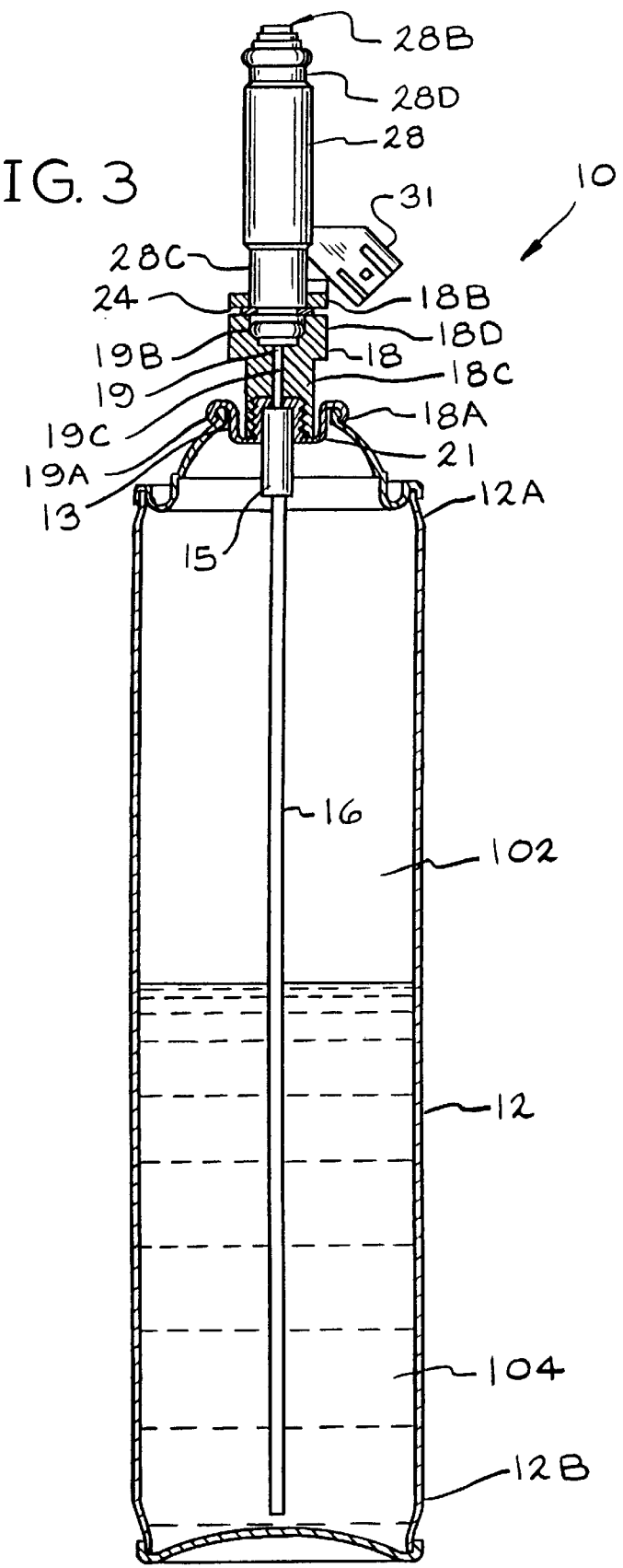

AUTOMATED ELECTRONICALLY CONTROLLED MICROSPRAYER

CROSS-REFERENCES TO RELATED APPLICATIONS

This application is a continuation-in-part of U.S. application Ser. No. 08/841,429, filed Apr. 22, 1997 now U.S. Pat. No. 5,964,403.

STATEMENT REGARDING FEDERALLY SPONSORED RESEARCH OR DEVELOPMENT

This invention was developed under United States Department of Agriculture Grant No. (O.R.D.) 65024 and Amendment 58-1931-5-030. The Federal government has certain rights in the invention.

REFERENCE TO A "MICROFICHE APPENDIX"

Not Applicable

BACKGROUND OF THE INVENTION (1) Field of the Invention

The present invention relates to an apparatus for periodically dispensing a fluid over an area by spraying. The present invention particularly relates to an electronic microdispensing apparatus for spraying pheromones in controlled amounts for a short duration in timed intervals to control insects in an outdoor setting such as an orchard.

(2) Description of the Related Art

Disruption of intraspecific chemical communication in insects can be accomplished by controlled release of synthetic pheromone to permeate the air within a crop (Cardé and Minks, Control of moth pests by mating disruption: successes and constraints, "Annu. Rev. Entomol." 40:559–585 (1995). Commercial application of this principle for control of crop pests has led to the development of various devices that provide a pheromone reservoir and controlled release of the contents into the crop. A common method of pheromone release relies upon evaporation from small pieces of polymer impregnated or filled with pheromone. These devices can be relatively simple to construct and apply, but a high density of devices is required per unit area (McDonough et al, Performance characteristics of a commercial controlled-release dispenser of sex pheromone for control of codling moth (*Cydia pomonella*) by mating disruption, "J. Chem. Ecol." 18:2177–2189 (1992). Because the pheromones of some insect species are prone to oxidative and photodegradation (Millar, J. G., Degradation and stabilization of E8-E10-dodecadienol, the major component of the sex pheromone of the codling moth (Lepidoptera: Tortricidae) "J. Econ. Entomol." 88:1425–1432 (1995), precautions must be taken to shield labile pheromones to maintain behavioral activity throughout a full growing season. Pheromone also can be encapsulated in semipermeable polymeric membranes to produce a formulation that is applied directly onto the crop using standard agricultural technology (Vickers, R. A. and Rothschild, G. H. L., Use of sex pheromones for control of codling moth, pp. 339–354. In L. P. S. van der Geest and H. H. Evenhuis [eds.], Tortricid moths: their biology, natural enemies and control, Elsevier, Amsterdam (1991). These systems are usually characterized by first-order decay release rates, making long-term disruption with a single application problematic. Application from a high density of sources is conducted to uniformly permeate a crop with pheromone.

A more recently developed approach is to release the same total amount of pheromone per unit area, but from far fewer point sources, thus relying on wind movement to disperse the pheromone throughout the crop. The super-low density approach to dispensing pheromones has been tested with devices that provide intermittent release, to provide predetermined release rates and a stable environment for a large reservoir of pheromone prior to its release. Reduction of insect pest populations and crop damage has been reported in studies of the efficacy of this approach in field crops (Shorey et al, Widely separated pheromone release sites for disruption of sex pheromone communication in two species of Lepidoptera, "Environ. Entomol." 25:446–451 (1996); (Shorey et al, Disruption of pheromone communication in *Spodoptera exigua* (Lepidoptera: Noctuidae) in tomatoes, alfalfa, and cotton, "Environ. Entomol." 23:1529–1533 (1994); (Baker et al, Disruption of sex pheromone communication in the blackheaded fireworm in Wisconsin cranberry marshes by using MSTRS™ devices, "J. Agric. Entomol." 14:449–457 (1997), tree crops (Shorey, H. H. and Gerber, R. G., Use of puffers for disruption of sex pheromone communication among navel orangeworm moths (Lepidoptera: Pyralidae) in almonds, pistachios, and walnuts, "Environ. Entomol." 25:1154–1157 (1996); (Shorey et al, "Use of puffers for disruption of sex pheromone communication of codling moths (Lepidoptera: Tortricidae) in walnut orchards, "Environ. Entomol." 25:1398–1400 (1996), stored products (Mafra-Neto, A. and Baker, T. C., Timed, metered sprays of pheromone disrupt mating of *Cauda cautella* (Lepidoptera: Pyralidae) "J. Agric. Entomol." 13:149–168 (1996) and cranberry marshes (Baker et al, Ibid.); Fadamiro et al, Suppression of mating by blackheaded fireworm (Lepidoptera: Tortricidae) in Wisconsin cranberry marshes using MSTRS™ devices "J. Agric. Entomol." 15:377–386 (1998). The release devices have been referred to as "puffers" (Shorey et al, Ibid.) and "misters" (MSTRS™) (Baker et al, Ibid), and though these studies have demonstrated the effectiveness of this approach, the devices are modifications of preexisting technology designed for indoor use. Hardware reliability is critical with this approach because at the low density of deployment, any failure to release pheromone has a large impact on the total release rate per unit area. This requirement may exceed the design limits of current technologies for super-low density release of pheromone, and for commercial use the grower would expect season-long operation.

In the past, pheromones for disruption of insect chemical communication have been released from impregnated solids like rubber and plastic in sizes ranging from sprayed microcapsules to foot-long strips hung on trees, open-ended hollow fibers where evaporation rate is controlled by size of the openings, and hollow polyethylene tubes having their lumen filled with chemical and heat-sealed at the end. Release rate from these "ropes" or other such releasers having an undiluted chemical reservoir is most preferably constant until the reservoir is exhausted.

A disadvantage of the above-mentioned dispersers is that they are perpetually "on" once deployed and cannot retain their chemical during periods when, due to pest life cycle, there may be no need to dispense the chemical. Dispensing the chemical only when needed is something that is economically desirable. Within the past two years, applied entomologists have adapted automatic aerosol dispensers to surmount this problem of wasting precious volatile chemicals by dispensing them indiscriminately over time. Automatic aerosol dispensers are used to dispense room deodorants or sometimes fumigants for insect pest control at timed intervals. At the intervals (e.g., 30 min. interval) a battery-powered motor turns gears attached to a lever that depresses the valve of an aerosol can, emitting a short pulse of can contents. Because many moth pests mate only at night, some automatic aerosol dispensers used for insect sex attractant release employ a photocell that precludes release in daylight. For this application, pheromone must be formulated with a propellant and packaged in a conventional spray can, which protects chemicals from exposure to the degradative factors of light and oxygen. The aerosol sprays onto a cloth pad from which it evaporates at a decreasing rate between pulses of spray.

Currently available are automatic aerosol dispensers which require a substantial amount of force (about 4 kg) to depress the aerosol can control valve. In addition, the mechanics and circuitry used to depress the aerosol control can valve on existing models are not maximally efficient and hence are more expensive than necessary. Furthermore, expensive and specialized equipment is required to charge or recharge an aerosol can. The currently available aerosol dispensers also have limited flexibility in control of their release of chemicals.

The related art has shown various types of automatic dispensing systems and apparatus. Illustrative are U.S. Pat. No. 3,305,134 to Carmichael et al; U.S. Pat. No. 3,523,646 to Waldrum; U.S. Pat. No. 4,272,019 to Halaby, Jr.; U.S. Pat. No. 4,473,186 to Alperin and U.S. Pat. No. 4,671,435 to Stout et al.

Carmichael et al describes an automatic spray device which will automatically and periodically dispense a compressed fluid. The device is used in connection with a pressure pack or aerosol container. The device comprises regulator valve mechanics connected to the pressure pack for regulating the exit flow of the propellant contained in the pressure pack and a diaphragm type valve in a chamber. The diaphragm type valve controls the flow of the fluid. When the propellant from the pressure pack accumulates and provides a proper pressure on the diaphragm valve, the valve will open, thus spraying the fluid. The device can be constructed with a separate container for the propellant or the fluid and propellant can be combined in the same container.

Waldrum describes a liquid sprayer which discharges the liquid in a direction opposite the direction of movement of the nozzle. The movement and direction of flow causes the uniform formation of droplets, which reduces the problem of drift.

Halaby, Jr. describes a programmable fluid sprayer apparatus for intermittent automatic delivery of an atomized fluid into the atmosphere for a selected duration of time at a selected frequency of delivery from at least one (1) adjustable fluid atomizing spray head. This apparatus is a complex system which permits only approved fluid to be dispensed for use in a particular area. Further, the spray nozzle means are spaced apart from the container of fluid to be atomized.

Aplerin describes a method and apparatus for spraying aerosols comprising small liquid or solid particles as fine mist over large distances while using minimal amounts of energy. The method and apparatus utilize the property of the ejector normally employed for momentum or thrust augmentation for dispersement of the liquid and solid aerosols over large distances with large divergence angles. The apparatus and method cause the substance to be sprayed to mix with a high velocity jet, thus causing an acceleration of the substance in the desired direction utilizing the drag force for projection over large distances rather than for deceleration and small spray distances.

Stout et al describes a solenoid operated valve. However, the nozzle and the valve are not joined together as in a fuel injector. The result is that there is less precision in the metering of the fluid to be sprayed.

The related art has also shown the use of solenoids to control the flow of liquids. U.S. Pat. No. 5,048,755 Dodds describes an irrigation system having a plurality of control valves for controlling the flow of water. The control valves can be individually controlled and can be solenoids. In addition, U.S. Pat. No. 5,074,443 to Fujii et al shows controlled dispensing of liquid through a syringe outlet by supplying constant air pressure to the interior of the syringe through an inlet and selectively retracting a valve shaft from a valve seat located at the syringe outlet to enable the pressurized liquid to be ejected through the outlet and out of the syringe. The valve shaft is retracted by a solenoid located in a housing assembly at the inlet of the syringe. U.S. Pat. No. 2,289,310 to Steel describes a paint gun having a double acting plunger activated by a solenoid coil. When the coil is activated, the plunger is retracted which opens the outlet port while at the same time closing the inlet port. The dual action of the plunger acts to limit the amount of paint sprayed during the activation time. U.S. Pat. No. 5,483,944 to Leighton et al and U.S. Pat. No. 5,570,813 to Clark, II show controlled, fluid delivery systems. However, none of the systems use a fuel injector.

Leighton et al describes a method and apparatus for metering liquid fuel for delivering to an engine. The patent also includes a method of metering fluids for cyclic delivery in variable discrete quantities comprising filling a fixed volume control chamber with the fluid each cycle, the control chamber being in direct communication with a dispensing chamber charged with a compressed gas, and then delivering a predetermined quantity of the fluid to the control chamber to displace fluid therefrom into the dispensing chamber and removing fluid from the control chamber to adjust the quantity of fluid displaced from the control chamber to the dispensing chamber.

Clark, II describes a delivery and management system for dispensing viscous material. Due to the type of material dispensed by this system it would not be obvious to use a fuel injector nozzle. In fact, the system would not operate correctly, if at all, using a fuel injector nozzle.

Only of some interest is EPO Patent No. 0220332 to Goudy which describes timing circuit for controlling the dispensing of a pelletized material and U.S. Pat. No. 4,852,802 to Iggulden et al and U.S. Pat. No. 4,962,522 to Marian which show a method for remotely controlling an irrigation system using a remote signal.

Only of minimal interest are U.S. Pat. No. 4,909,439 to Fu; U.S. Pat. No. 5,232,167 to McCormick et al; U.S. Pat. No. 5,244,180 to Wakeman et al; U.S. Pat. No. 5,289,627 to Cerny et al and U.S. Pat. No. 5,476,226 to Tomiita et al which show various types of solenoid valves used as fuel injectors.

There remains the need for an electronically controlled micro-dispensing apparatus which allows for controlling the duration and amount of the spray, as well as, the time interval between spraying and which is economical to manufacture and operate and portable and which allows for replacement of an empty container without replacing the entire apparatus.

SUMMARY OF THE INVENTION

The present invention relates to a dispenser apparatus for periodic, controlled dispensing of a chemical in a liquid form which comprises: a disposable sealed container having an orifice and containing a pressurized gas and the chemical in the liquid form; adaptor means configured to be sealingly connected to the orifice; a fuel injector nozzle sealingly connected to the adaptor means of the container capable of periodically dispensing the chemical in the liquid form by the pressurized gas from the container, wherein the fuel injector nozzle comprises: (i) a body with a passage therethrough; (ii) a valve needle moveable in the passage of the body to open and close the passage; (iii) a solenoid coil with electrical leads to the coil mounted on the body, so that the coil provides a continuous circuit surrounding the valve needle which is moved upon application of a current through the coil; and (iv) a bias means mounted in the body which holds the valve needle in a closed position when the current is not applied through the coil; and a control means which supplies current to the coil to move the valve needle against the bias means to open the passage in the body of the fuel injector nozzle and allows the chemical in the liquid form to be dispensed periodically from the container through the passage in the body of the fuel injector nozzle.

Further, the present invention relates to a dispenser apparatus for periodic controlled dispensing of a chemical in a liquid form which comprises: a disposable sealed container having an orifice which allows the pressurized gas to be provided in the container, the container being configured to hold a pressurized gas and the chemical in the liquid form; adaptor means configured to be sealingly connected to the orifice; a nozzle sealingly connected to the adaptor means for the dispensing, wherein the nozzle comprises: (i) a body with a passage therethrough; (ii) a valve needle moveable in the passage of the body to open and close the passage; (iii) a solenoid coil with electrical leads to the coil mounted on the body, so that the coil provides a continuous circuit surrounding the valve needle which is moved upon application of a current through the coil; and (iv) a bias means mounted in the body which holds the valve needle in a closed position when the current is not applied through the coil; and a control means for supplying current to the coil to move the valve needle against the bias means to open the passage in the body of the nozzle and allows the chemical in the liquid form to be dispensed periodically from the container through the passage in the body of the nozzle, wherein the control means is a self-contained circuit which is releasably connected to the nozzle and supplies the current periodically to the coil on a pre-programmed schedule.

Still further, the present invention relates to a system for periodically dispensing a chemical in a liquid form over an area which comprises: multiple dispenser apparatus containing the chemical in the liquid form, each dispenser apparatus comprising a disposable sealed container having an orifice and containing a pressurized gas and the chemical in the liquid form; adaptor means configured to be sealingly connected to the orifice; a fuel injector nozzle sealingly connected to the adaptor to the orifice of the container and capable of periodically dispensing less than 10 $\mu$L of the chemical in the liquid form by the pressurized gas, wherein the fuel injector nozzle comprises: (i) a body with a passage therethrough; (ii) a valve needle moveable in the passage of the body to open and close the passage; (iii) a solenoid coil with electrical leads to the coil mounted on the body so that the coil provides a continuous circuit surrounding the valve needle so that the needle is moved upon application of a current through the coil; and (iv) bias means mounted in the body which holds the valve needle in a closed position when the current is not flowing through the coil; control means which supplies current to the coil to move the valve needle against the bias means to open the passage in the fuel injector nozzle and allows the chemical in the liquid form and the gas to be dispensed periodically from the container through the passage in the body of the fuel injector nozzle; and a central processing unit as part of the control means which controls each of the multiple dispenser apparatus so that each dispenser apparatus periodically dispenses the chemical in the liquid form from the fuel injector nozzle.

Further still, the present invention relates to a method for dispensing a chemical in a liquid form which comprises the steps of: providing a dispenser apparatus comprising a disposable sealed container having an orifice which allows the pressurized gas to be provided in the container means and which can hold a pressurized gas and the chemical in the liquid form; adaptor means configured to be connected to the orifice; a fuel injector nozzle connected to the adaptor means of the container capable of periodically dispensing less than 10 $\mu$L of the chemical in the liquid form by the pressurized gas, wherein the fuel injector nozzle comprises: (i) a body with a passage therethrough; (ii) a valve needle moveable in the passage of the body to open and close the passage; (iii) a solenoid coil with electrical leads to the coil mounted on the body so that the coil provides a continuous circuit surrounding the valve needle which is moved upon application of a current through the coil; and (iv) bias means mounted in the body which holds the valve needle in a closed position when the current is not flowing through the coil; and control means for controlling the fuel injector nozzle; and activating the apparatus such that the control means supplies current to the coil to move the valve needle against the bias means to open the passage in the fuel injector nozzle so that the chemical in the liquid form and the pressurized gas are dispensed periodically from the container through the passage in the body of the fuel injector nozzle.

Finally, the method for dispensing a chemical in a liquid form which comprises the steps of: providing a dispenser apparatus comprising a disposable sealed container having an orifice and which can hold a pressurized gas and the chemical in the liquid form; adaptor means configured to be sealingly connected to the orifice; a nozzle sealingly configured to be connected to the adaptor means of the container, wherein the nozzle comprises: (i) a body with a passage therethrough; (ii) a valve needle moveable in the passage of the body to open and close the passage; (iii) a solenoid coil with electrical leads to the coil mounted on the body so that the coil provides a continuous circuit surrounding the valve needle which is moved upon application of a current through the coil; and (iv) bias means mounted in the body which holds the valve needle in a closed position when the current is not flowing through the coil; self-contained circuit mounted on the container for controlling the nozzle; and activating the apparatus so that the self-contained circuit supplies current periodically to the coil on a pre-programmed schedule to move the valve needle against the bias means to open the passage in the nozzle so that the chemical in the liquid form and the pressurized gas are dispensed periodically from the container through the passage in the body of the nozzle.

The present invention provides an electronically controlled micro-dispensing apparatus which has user adjustable control circuitry to allow for dispensing of a chemical in a liquid form such as insect pheromones at various time intervals and in varying amounts. The dispensing apparatus can also be provided with sensors external of the control circuit to sense environmental conditions such as light intensity temperature and wind speed to control the release of the chemical to correspond with the periods of insect mating or other insect activities. The dispensing apparatus operates on batteries over a long period of time and is designed to provide reliable, precise, season-long release of insect pheromones without the need for maintenance, refilling or component replacement. The apparatus also allows for replacement of an empty container to allow for reuse of the major components of the apparatus.

The substance and advantages of the present invention will become increasingly apparent by reference to the following drawings and the description.

BRIEF DESCRIPTION OF THE DRAWINGS

FIG. 2 is an exploded view of the spraying apparatus 10 showing the container 12, the adaptor 18 and the nozzle 28.

FIG. 3 is a cross-sectional view of the spraying apparatus 10 showing the chemical 104 and propellant 102 in the container 12.

DETAILED DESCRIPTION OF THE PREFERRED EMBODIMENTS

Figure 1:
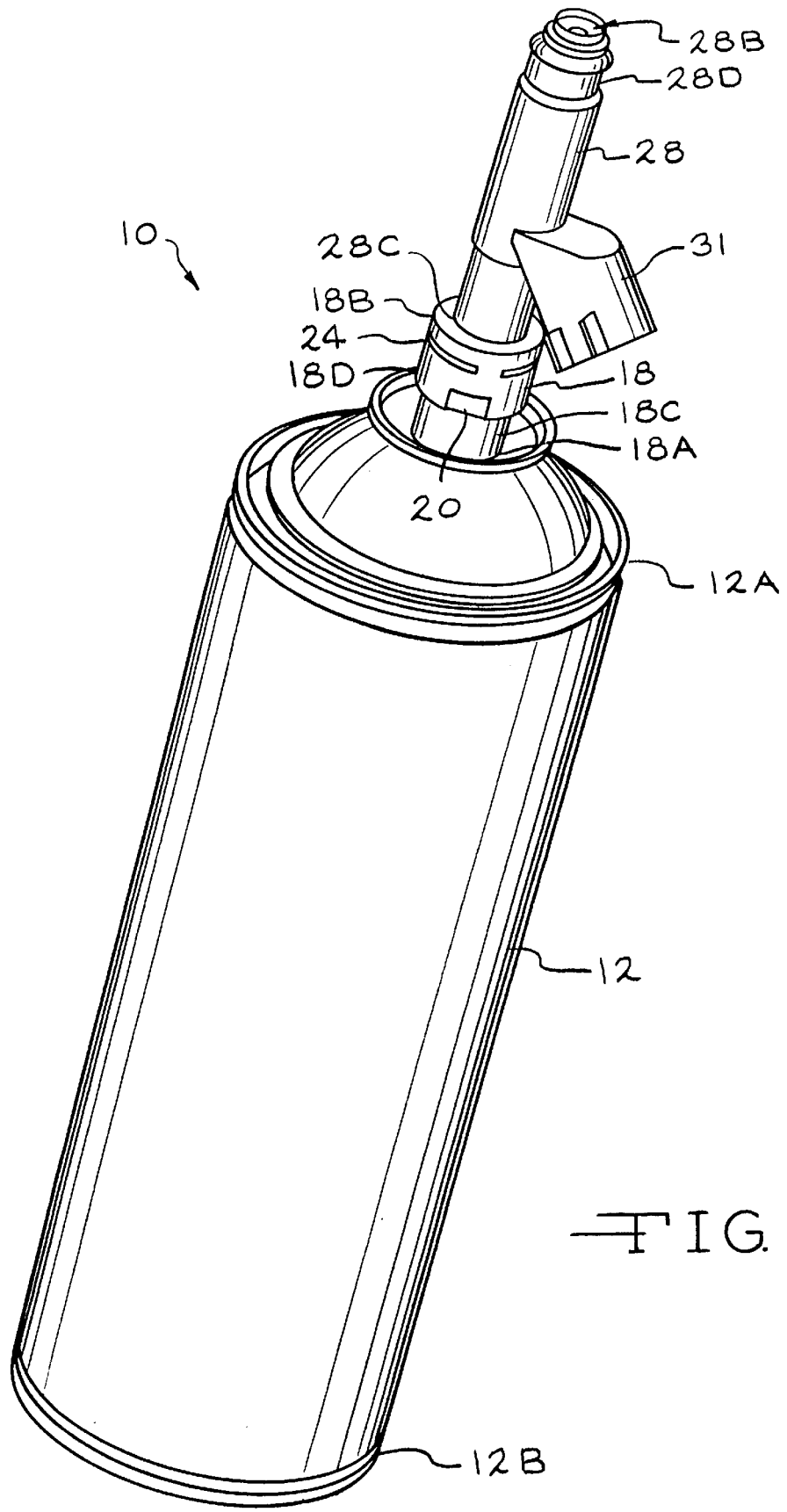
FIG. 1 is a perspective view of the spraying apparatus 10 of the present invention showing the container 12 and the nozzle 28.

FIG. 1 shows the first embodiment of the apparatus 10 of the present invention. The apparatus 10 includes a disposable, sealable container or canister 12, a reusable adaptor 18, a reusable nozzle 28 and a reusable timing or control circuit 34 or 42. The container 12 is preferably similar to commercially available propellant containers having a single orifice 13 in the top 12A of the container 12 through which the pressurized gas or propellant 102 and chemical 104 is filled into the container 12. The propellant 102 and liquid can be filled into the container 12 by any well known means. The container 12 preferably contains 550 mL of an ethanol and pheromone mixture with about 15% pheromone and about 110 mL of propellant are added. Preferably, the amount of chemical 104 in the container 12 is enough for one (1) growing season. However, the size of the container 12 and the amount of chemical 104 in the container 12 can be adjusted depending on the size of the area to be treated and the time period over which the apparatus 10 is to operate. It is understood that the amount of the propellant 102 in the container 12 is directly related to the amount of chemical 104 to be dispensed. The propellant 102 can be either a gas or a liquid. In the preferred embodiment, the propellant 102 is difluoroethane or a low molecular weight hydrocarbon mixture (A-70) filtered to 0.1 micron; however, other known propellant might be used. The container 12 is preferably constructed of an inert metal such as stainless steel, brass or aluminum. The container 12 must be constructed such as to protect the chemical 104 from oxygen and ultraviolet light such as to retain behavioral activity.

In the preferred embodiment, the container 12 is not reusable. Once the container 12 is filled, the orifice 13 at the top 12A of the container 12 is closed and is provided with an outlet 14 having a valve 15. A tube 16 extends from the valve 15 into the interior of the container 12 and allows for removal of the propellant 102 and chemical 104 from the container 12. The valve 15 prevents the propellant 102 and chemical 104 from escaping from the container 12. The outlet 14 of the container 12 preferably has an extension 17 having threads around its outer surface. The threaded extension 17 has a center bore 17A which is concentric with the outlet 14.

Figure 3A:
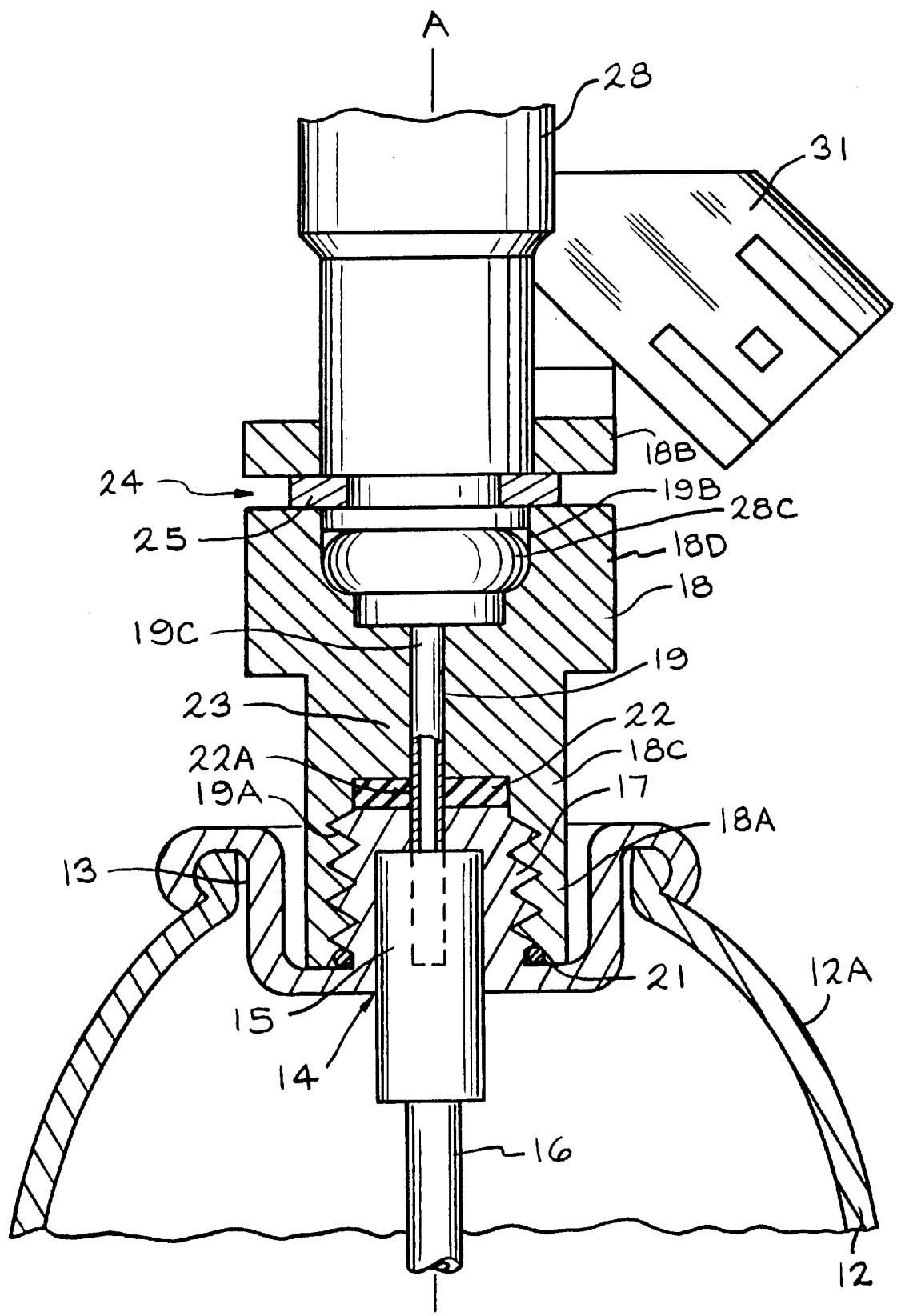
FIG. 3A is a cross-sectional view of the adaptor 18 showing the center bore 19 and the plug 22 with the tube 17.

The adaptor 18 is removably attached to the extension 17 on the top 12A of the container 12 (FIG. 3). The adaptor 18 has opposed ends 18A and 18B with a first portion 18C adjacent the first end 18A and a second portion 18D adjacent the second end 18B with a center bore 19 extending between the ends 18A and 18B along the longitudinal axis A—A of the adaptor 18. The center bore 19 extends completely through the adaptor 18 and has a first section 19A adjacent the first end 18A and a second section 19B adjacent the second end 18B (FIG. 3A). The first and second sections 19A and 19B are connected together by a center section 19C. The first section 19A has a diameter essentially equal to the diameter of the threaded extension 17 on the top 12A of the container 12. A portion of the first section 19A of the center bore 19 is provided with threads which threadably mate with the threads of the threaded extension 17 to secure the adaptor 18 onto the container 12. The entrance of the first section 19A of the center bore 19 adjacent the first end 18A of the adaptor 18 preferably is not provided with threads and is beveled such that the diameter of the entrance of the first section 19A of the center bore 19 decreases as it extends inward toward the threaded portion of the first section 19A. An o-ring 21 is provided in the entrance of the first section 19A of the center bore 19. The o-ring 21 allows for sealingly connecting the adaptor 18 to the top 12A of the container 12. The outer diameter of the first portion 18C is preferably greater than the outer diameter of the second portion 18D. The outer surface of the first portion 18C is preferably knurled to allow for easier turning of the adaptor 18 when the adaptor 18 is to be removed from the container 12. In the preferred embodiment, the outer surface of the first portion 18C is also provided with gripping flats 20 which allow for better gripping by a wrench or pliers to allow for easier removal of the adaptor 18 from the container 12 or from the nozzle 28.

A plug 22 having a center opening 22A within which is mounted a tube 23 is mounted in the first section 19A of the center bore 19 adjacent the center section 19C. The tube 23 preferably has a diameter similar to the diameter of the center section 19C of the center bore 19. The tube 23 extends outward from the plug 22 into the first section 19A of the center bore 19. The tube 23 is of such a length that when the adaptor 18 is attached to the threaded extension 17 on the top 12A of the container 12, the tube 23 extends into the center bore 17A in the threaded extension 17 and into the valve 15 in the orifice 13 of the container 12 such as to open the valve 15.

The first portion 18C of the adaptor 18 has an outer diameter of about 0.875 inches (2.223 cm). The second portion 18D of the adaptor 18 has an outer diameter of about 0.75 inches (1.91 cm). However, it is understood that any durable material which can withstand the environmental conditions and which is not degradable by the chemical 104 or propellant 102 can be used.

The second section 19B of the center bore 19 has a diameter equal to or slightly greater than the diameter of the first end 28C of the nozzle 28. In the preferred embodiment, the first end 28C of the nozzle 28 is provided with an o-ring 21 which secures the first end 28C of the nozzle 28 in the second section 19B of the center bore 19 of the adaptor 18 (FIG. 3). The sidewall of the adaptor 18 at the second section 19B of the center bore 19 is provided with a pair of curved slots 24 which curve around the longitudinal axis A—A of the adaptor 18. The slots 24 are spaced from the second end 18B of the adaptor 18 such that when the nozzle 28 is mounted in the second section 19B of the center bore 19, the slots 24 in the sidewall of the adaptor 18 match up with the concentric groove 27 in the first end 28C of the nozzle 28 (to be described in detail hereinafter). A pair of lock rings 25 are provided for inserting through the slots 24 in the sidewall of the adaptor 18 (FIG. 2). The lock rings 25 preferably have a semi-circular shape. The lock rings 25 act to secure or lock the nozzle 28 in the adaptor 18.

Figure 10:
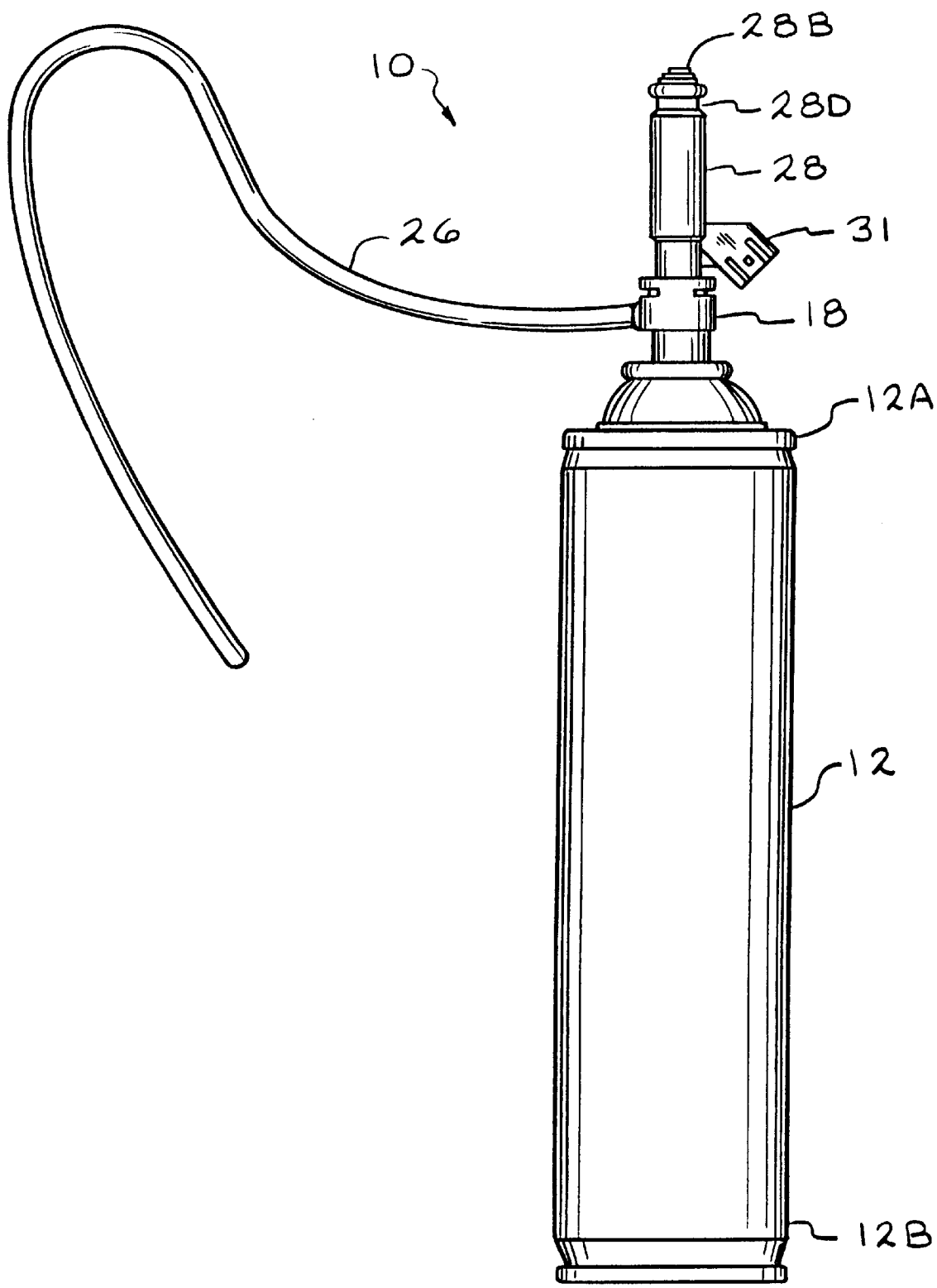
FIG. 10 is a side view of the spraying apparatus 10 showing the mounting hook 26 attached to the adaptor 18.

In the one (1) embodiment, a mounting hook 26 is provided on the adaptor 18 (FIG. 10). The mounting hook 26 is preferably flexible and allows the apparatus 10 to be wrapped around a tree branch or a pole 58. The flexibility of the mounting hook 26 allows for the apparatus 10 to be mounted in a variety of positions. The mounting hook 26 can also be provided with a covering to reduce damage to the tree. In another embodiment (not shown), the mounting hook 26 is provided on the container 12.

Figure 12:
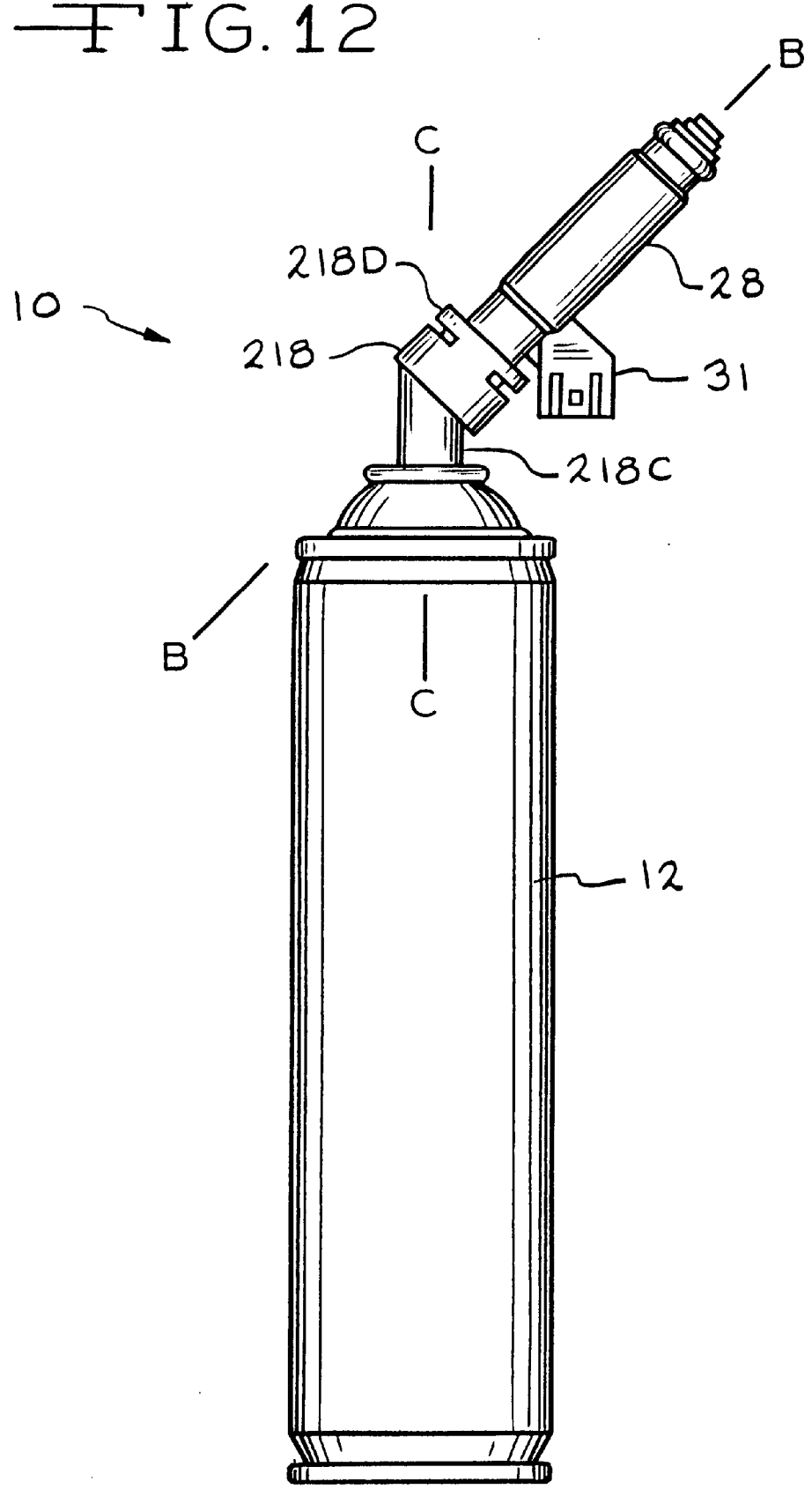
FIG. 12 is a side view of the spraying apparatus 10 showing the adaptor 218 of the alternate embodiment having the second portion 218D mounted at an angle to the first portion 218C.

In an alternate embodiment, the end of the first portion 218C of the adaptor 218 adjacent the second portion 218D is angled such that the second portion 218D extends outward from the first portion 218C at an angle (FIG. 12). Thus, the longitudinal axis B—B of the second section of the center bore is at an angle with the longitudinal axis C—C of the first section of the center bore. In the preferred embodiment, the longitudinal axis B—B of the second section is at a 45° angle with the longitudinal axis C—C of the first section of the center bore of the adaptor 218. The 45° angle allows the container 12 to remain horizontal during dispensing by compensating for any curvature in the tube 16. In addition, the 45° angle allows the stream of chemical 104 and/or chemical 104 and propellant 102 to project both upward and outward which provides better distribution of the droplets and prevents the apparatus 10 from spraying back on itself which allows the apparatus 10 to remain cleaner.

Figure 6:
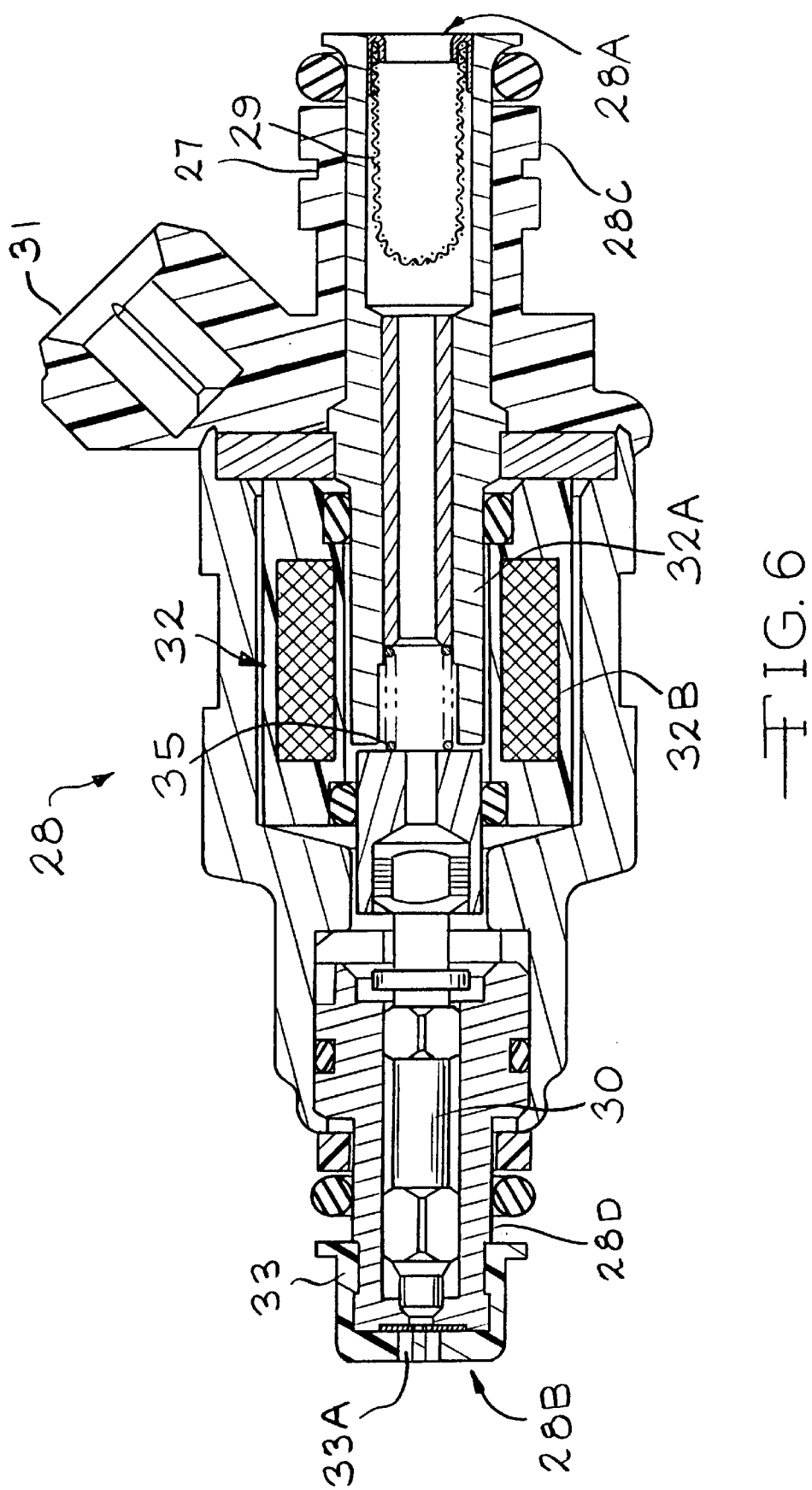
FIG. 6 is a front cross-sectional view of a solenoid controlled nozzle 28.

The nozzle 28 has opposed ends 28C and 28D with an inlet 28A in the first end 18C and an outlet 28B in the second end 28D (FIG. 6). The first end 28C of the nozzle 28 is provided with a concentric groove 27. The inlet 28A preferably has an integral filter 29. The nozzle 28 also includes an electrical connector 31, a solenoid 32 having an armature 32A, a coil 32B and a valve mechanism with a valve needle or pintle 30. The first end 28C of the nozzle 28 is connected to the adaptor 18. The nozzle 28 is mounted in the second section 19B of the center bore 19 of the adaptor 18. The nozzle 28 is preferably a pintle type injector similar to those used as fuel injectors for automotive vehicles. However, it is understood that a ball type injector or a disc type injector can be used. The pintle 30 preferably has a stainless steel body and which is moved into the "open" position by the solenoid 32 located in the base of the nozzle 28 (FIG. 6). Preferably, when the solenoid 32 is activated, the solenoid 32 moves the pintle 30 into the open position which allows the liquid and propellant 102 in the container 12 to be expelled from the nozzle 28. Once the solenoid 32 is deactivated, a spring acts to move the pintle 30 into the "closed" position. When activated, the nozzle 28 preferably ejects a stream of the liquid through the outlet 28B of the nozzle 28. In the preferred embodiment, controlling the pintle 30 of the nozzle 28 allows a precise amount of the liquid to be ejected during one pulse. The outlet 28B of the nozzle 28 preferably has a protection cap 33. The protection cap 33 has at least one small orifice 33A which enables the nozzle 28 to propel the liquid a greater distance in a stream. In the preferred embodiment, the protection cap 33 has four orifices 33A. The amount of liquid delivered by the nozzle 28 depends on how long the nozzle 28 remains in the open position. In the preferred embodiment, the nozzle 28 is a fuel injector (port injection) similar to the model 0 280 150 718 manufactured by Robert Bosch.

Figure 11:
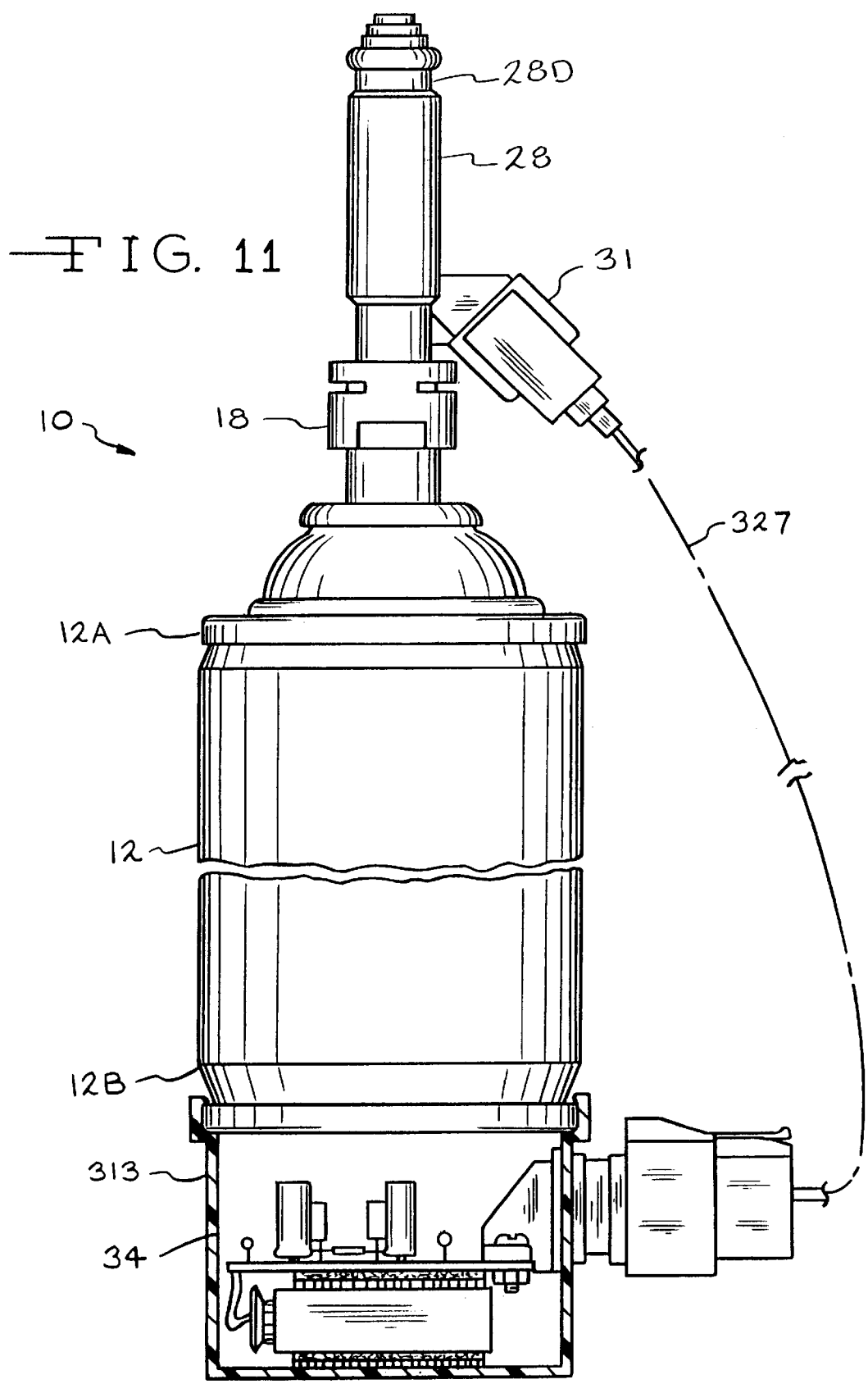
FIG. 11 is a side view of the spraying apparatus 10 having the control circuit 34 shown in cross-section attached to the bottom 12B of the container 12.
Figure 13:
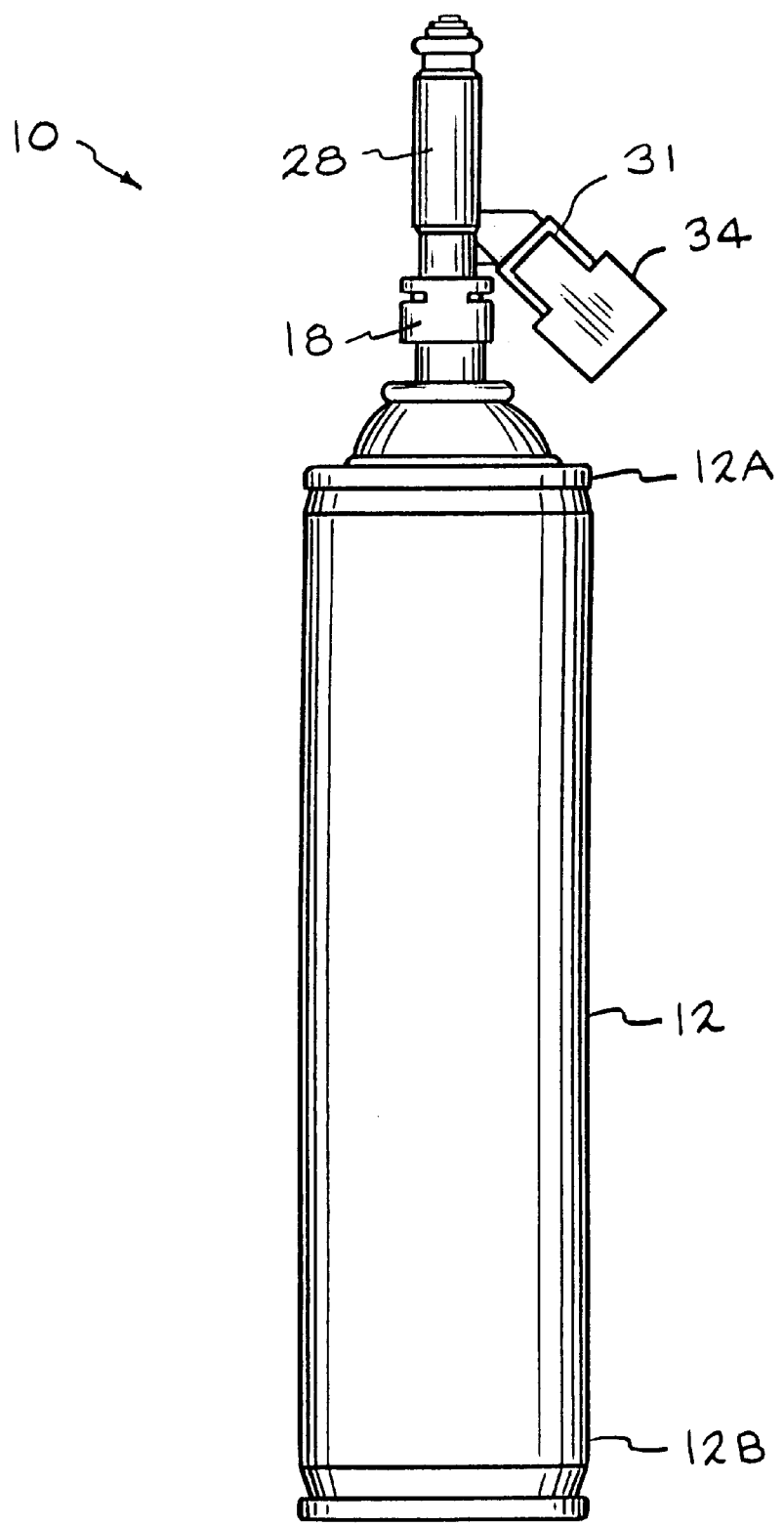
FIG. 13 is a side view of the spraying apparatus 10 having the control circuit 34 directly connected to the electrical connector 31 of the nozzle 28.

The nozzle 28 is activated and controlled by a control circuit 34 or 42. The control circuit 34 or 42 is connected to the electrical connector 31 of the nozzle 28. The circuit 34 or 42 is preferably mounted in a weatherproof, watertight box 35 which allows the circuit 34 or 42 to be used and left out of doors. The control circuit 34 or 42 is preferably reusable. In one (1) embodiment, the control circuit 34 or 42 is mounted directly to the electrical connector 31 of the nozzle 28 (FIG. 13). This eliminates the need for a wiring harness. In addition, when the nozzle 28 is removed from the used container 12, the control circuit 34 or 42 is also removed. In another embodiment (not shown), the control circuit 34 or 42 is mounted to the adaptor and is connected to the electrical connector 31 of the nozzle 28 by a wiring harness. In another embodiment, the control circuit 34 is removably mounted to the bottom 12B of the container 12 and is connected to the electrical connector 31 of the nozzle 28 by a wiring harness 327 (FIG. 11). The control circuit 34 is preferably in a self-contained box 313 such that when the container 12 is empty, the circuit box 313 can be removed from the empty container 12 and attached to a new, full container 12.

Figure 4:
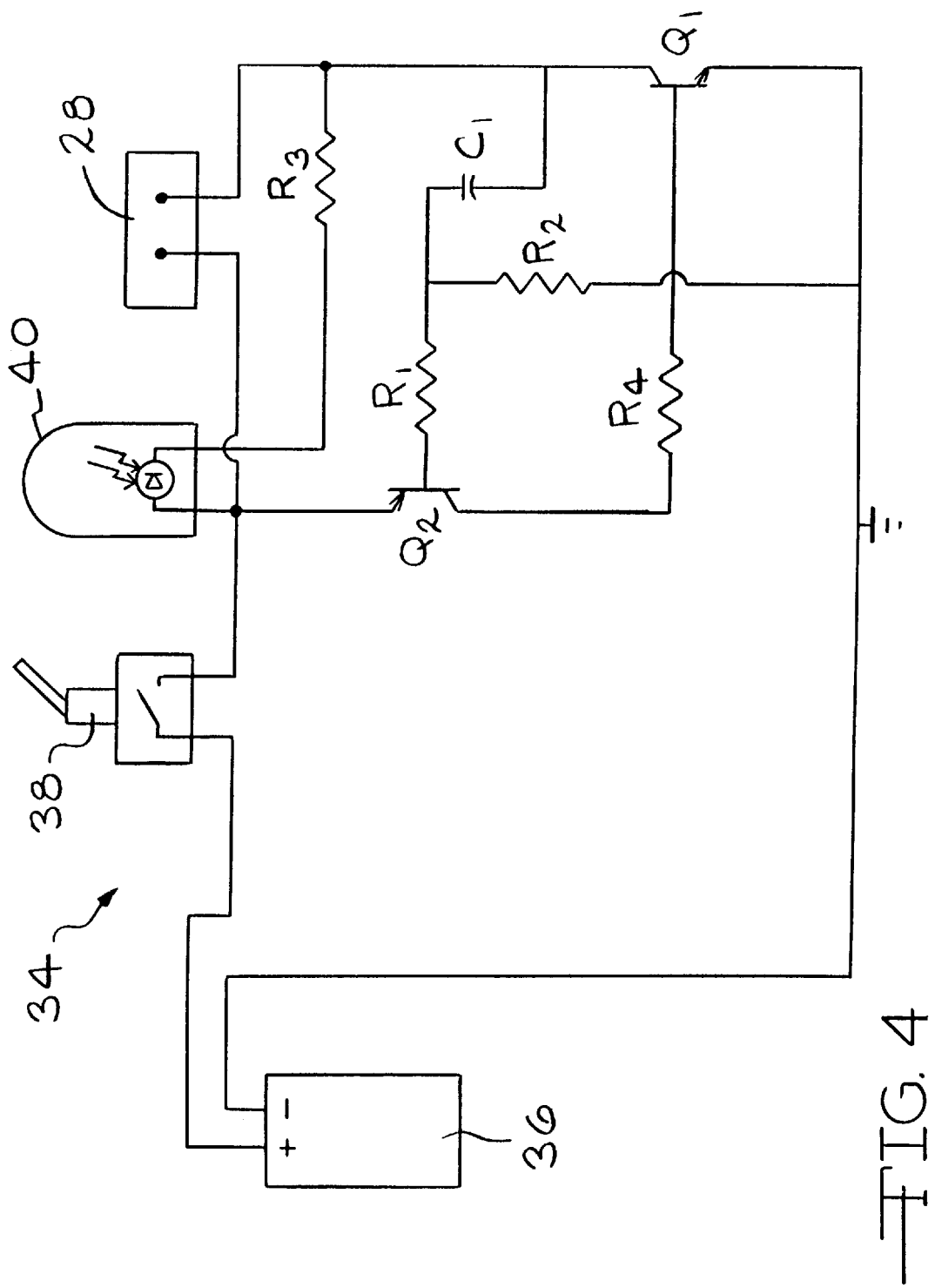
FIG. 4 is a schematic representation of the timer control circuit 34.

In the preferred embodiment, the nozzle 28 is controlled by a first control circuit 34 (FIG. 4). The circuit 34 uses a capacitor $C_1$ in combination with transistors $Q_1$ and $Q_2$ and resistors $R_1$, $R_2$, $R_3$ and $R_4$ to create a low power, timing circuit for activating and deactivating the nozzle 28 of the apparatus 10. Preferably, the first control circuit 34 includes a power source 36, a switch 38, a capacitor $C_1$, a pair of transistors $Q_1$ and $Q_2$ and resistors $R_1$, $R_2$, $R_3$ and $R_4$. The power source 36 preferably is a 9V source such as either a 9V battery or six (6) AA, 1.5V batteries. The switch 38 is preferably a standard "on", "off" switch. An LED 40 is preferably included in the circuit 34 to indicate that the solenoid 32 has been activated by the circuit 34. Preferably, when the solenoid 32 is activated, the LED 40 is flashed to clearly indicate that the apparatus 10 is functioning. In general, in the first control circuit 34, when the capacitor $C_1$ has discharged, current is allowed to flow in the circuit 34 which activates the solenoid 32 to "open" the valve 30 of the nozzle 28 to dispense the liquid. When the capacitor $C_1$ is fully charged, the capacitor $C_1$ prevents current from flowing in the circuit 34 and in the solenoid 32 which in turn deactivates the solenoid 32 of the nozzle 28 or 216 which allows the spring to move the valve needle of the valve 30 of the nozzle 28 or 216 into the "closed" or "off" position which causes the nozzle 28 to stop dispensing the liquid. In the preferred embodiment, the first transistor $Q_1$ is a 3704 NPN transistor and the second transistor $Q_2$ is a 4403 PNP transistor. The capacitor $C_1$ preferably has a value of 100 $\mu$F. However, the value of $C_1$ can be varied depending on the desired duration of the period of operation of the apparatus 10. In the preferred embodiment, the first resistor $R_1$ has a value of 20$\Omega$. However, the first resistor $R_1$ is preferably removably mounted in the circuit 34 through use of a component socket. The first resistor $R_1$ is intended to be easily changed to allow for easily adjusting the timing of the circuit 34. In the first control circuit 34, lowering the value of $R_1$ causes the capacitor $C_1$ to charge faster, which results in reducing the duration the nozzle 28 or 216 is "on". However, this current is limited by $I_{EB\ MAX}$ in the circuit 34 which is a function of $Q_1$, $Q_2$ and the load of the nozzle 28. The second and fourth resistors $R_2$ and $R_4$ preferably have a value of 2 m$\Omega$ and 560$\Omega$, respectively. The value of $R_4$ controls the "on" duration of the nozzle 28 or 216. The greater the value of $R_4$, the smaller the current in the nozzle 28 or 216. As the value of $R_4$ is increased, the time span between activation of the nozzle 28 and deactivation of the nozzle 28 decreases. $R_4$ is not required unless the required ejector "on" duration is less than the fastest capacitor charging time which is when $R_1$=0$\Omega$. The value of $R_4$ is also a function of the gas pressure of the apparatus 10. For higher pressures, longer currents are required to open the nozzle 28. A smaller $R_4$ compensates this larger current. The first control circuit 34 enables the nozzle 28 or 216 to have an "on" cycle period or pulse duration of between about 2 msec and about 1 sec. The time between pulses is preferably between about 1 sec. and 300 sec. (5 min.). In the preferred embodiment, activating and deactivating the nozzle 28 requires only nominal power which allows the apparatus 10 to operate for long periods of time without the need to replace the battery 36. Preferably, the battery 36 can operate the circuit 34 and control the dispensing of the liquid from the apparatus 10 for one (1) year. Current testing shows this circuit 34 can run for at least 6 months in the lab on a standard 9V Duracell® battery. The testing is still on going.

Figure 5:
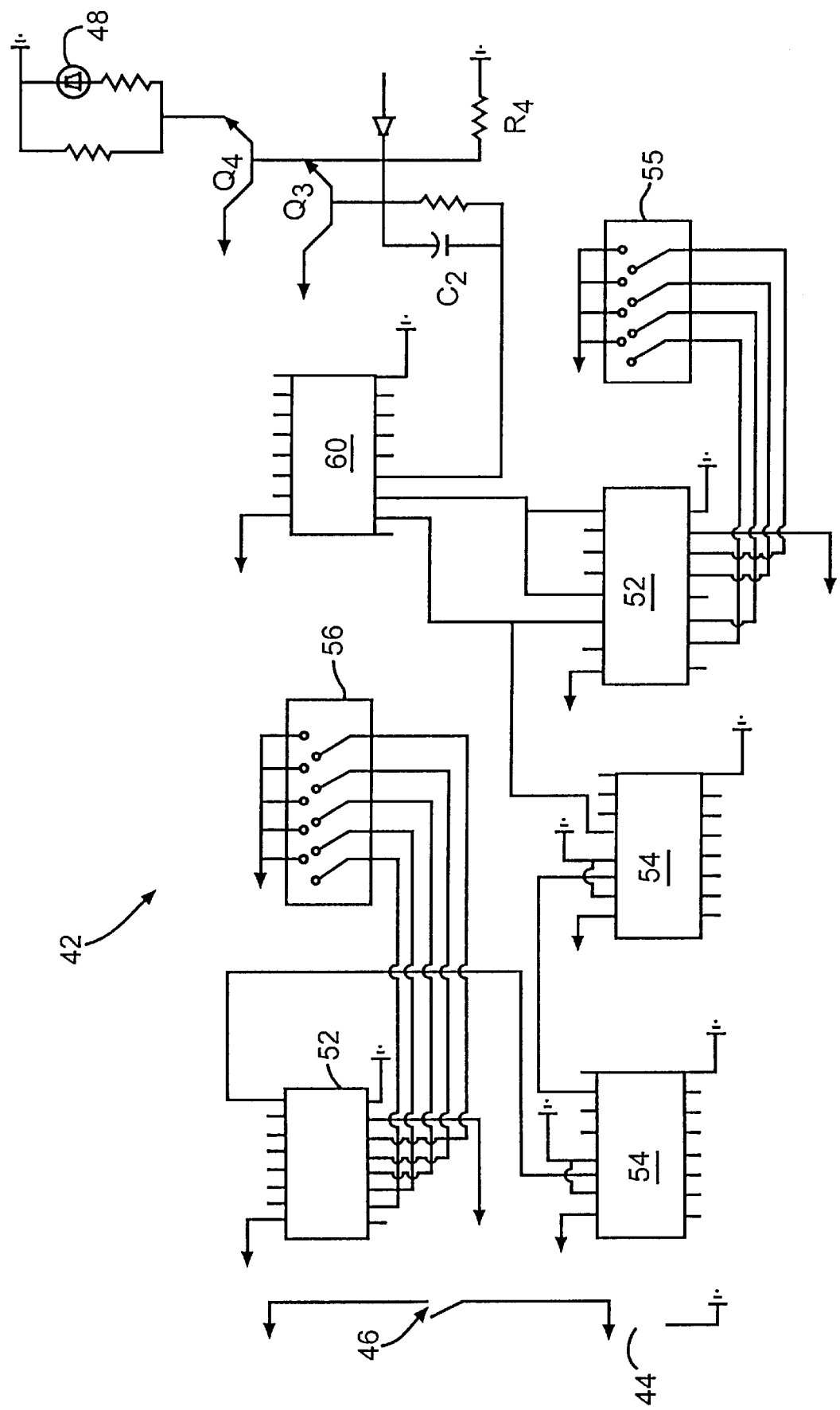
FIG. 5 is a timer control circuit 42 when multiple spraying apparatus 10 are used.

In an alternate embodiment, a second control circuit 42 is used to activate and deactivate the apparatus 10 (FIG. 5). The second control circuit 42 is programmable so that the user is able to specifically program the duration of the pulse of liquid and the time delay between each pulse for the apparatus 10. The second control circuit 42 allows for a wider variety of pulse durations and cycle periods. Preferably, the second control circuit 42 enables the nozzle 28 to have an "on" cycle period or pulse duration with a range of between about 5 msec and 15 sec. The time between pulses or between the activated mode and deactivated mode of the nozzle 28 preferably has a range of between about 1 sec. and 12,000 sec. As with the first control circuit 34, the second control circuit 42 includes a power supply 44 which is preferably 9V and is comprised of either a 9V battery or six (6) 1.5V AA batteries and a switch 46 which is preferably a standard "on"/"off" switch well known in the art. The circuit 42 also includes a pair of programmable oscillators 52, a pair of decade counters 54, an 8 position and a 16 position BCP coded Rotary dip switch 55 and 56 and a Quad XOR CMOS 60. The programmable oscillators 52 of the second control circuit 42 are preferably similar to the PXO-1000 manufactured by Statek of Orange, Calif. The decade counters 54 are preferably the CD4017 such as manufactured by National Semiconductor. The 8 position and 16 position BCP coded Rotary dip switches 55 and 56 are preferably similar to the 948-9002 and 948-9012 distributed by Allied located in Grand Rapids, Mich. The QUAD XOR CMOS 60 is manufactured by National Semiconductor. The circuit 42 also preferably has a 100 $\mu$F capacitor $C_2$, two NPN transistors $Q_3$ and $Q_4$ and a 580$\Omega$¼ watt resistor $R_4$. As with the first control circuit 34, the second circuit 42 can also be provided with an LED 48 to indicate the circuit is active. As with the first control circuit 34, the second control circuit 42 is preferably mounted in a weatherproof box (not shown).

Figure 8:
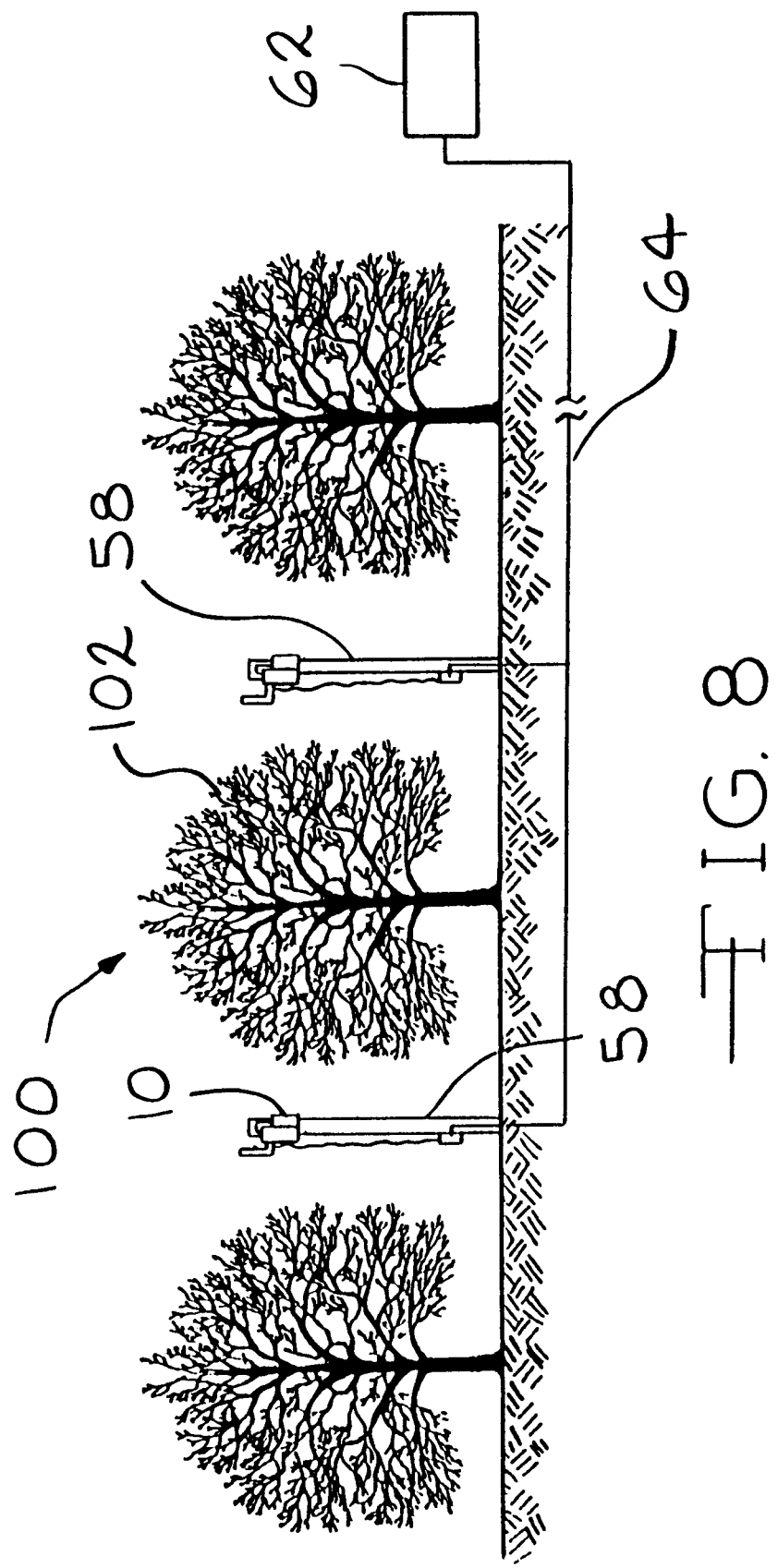
FIG. 8 is a front view showing use of the apparatus 10 in an orchard 100 with the apparatus 10 controlled by a single computer 62.
Figure 9:
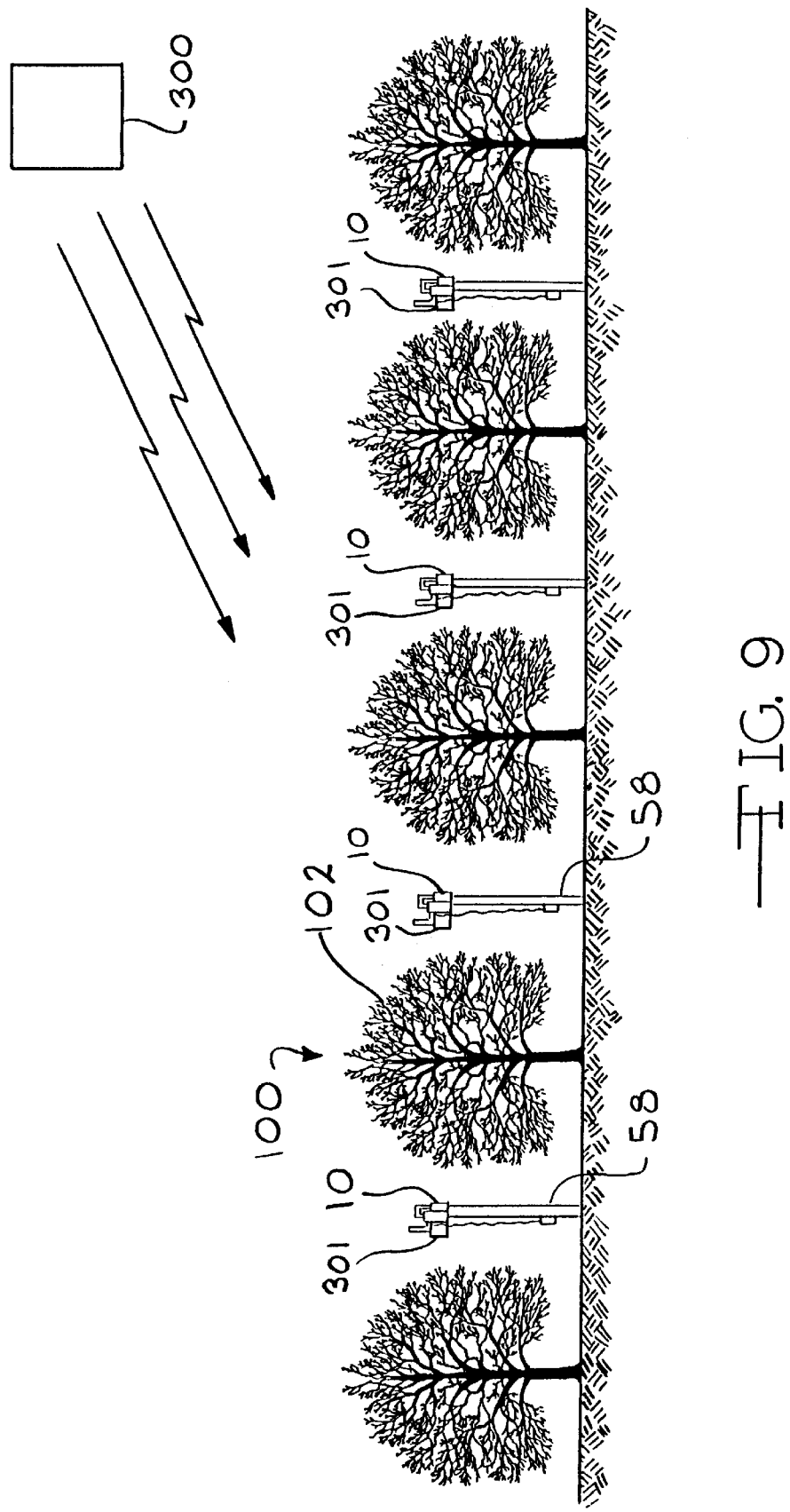
FIG. 9 is a front view showing use of the spraying apparatus 10 in an orchard 100 with the apparatus 10 remotely controlled by a transmitter 300.

In another alternate embodiment, the apparatus 10 is controlled by a remote electromagnetic wave transmitter 300 such as through the use of radio frequency waves (FIG. 9). In this embodiment, the control is a remote electromagnetic wave transmitter 300 controlling a receiver 301 connected to the coil 32 of the nozzle 28 on the container 12. When activated by the transmitter 300, the receiver 301 allows current to flow to the coil 32 thus removing the needle valve bracket (pintle) 30 to the outlet 28B in the orifice 33A in the nozzle 28. The spring acts to move the pintle 30 to the closed position. The apparatus 10 could also be remotely controlled by a satellite (not shown). Such a system is described in U.S. Pat. No. 5,208,855 to Marian. In an additional alternate embodiment, several apparatuses 10 can be controlled as a single unit or separately by a computer 62 (FIG. 8). The individual apparatuses 10 can be individually connected to the computer 62 or the apparatuses 10 can be connected together and then connected to the computer 62 as a single unit. The computer 62 could have separate addresses and separate drivers for each apparatus 10 which would allow individualized control of each individual apparatus 10. The control circuit 34 or 42 of the apparatus 10 could be provided with sensors (not shown) for sensing environmental conditions such as temperature and wind speed which would allow the circuit to respond to different environmental conditions and control the release of the liquid. In the preferred embodiment, the sensors would allow the apparatus 10 to spray the pheromone 104 during periods of actual insect mating. In any of the embodiments, preferably, the control circuit which is used is inexpensive to construct and inexpensive to operate. Preferably, the apparatus 10 is run on batteries and has a long life. In all the above embodiments, the use of the electronic control circuitry with the solenoid 32 activated nozzle 28 or 216 allows the apparatus 10 to run efficiently on very low voltage and to operate very quietly.

In Use

In the preferred embodiment, the electronic micro-dispensing apparatus 10 is used to automatically dispense a set amount of chemical 104 over a set amount of time in an outdoor setting to control insects. The release rates can be set in advance to provide the optimal combination of release frequency and duration that will apply sufficient pheromone 104 into the crop for the duration required. In the preferred embodiment, the fluid to be dispensed is a liquid pheromone 104. The liquid pheromone 104 attacks the insects and confuses the insects to prevent mating. However, other insect controlling liquids such as pesticides or fungicides could also be used. The apparatus 10 can also be used to dispense a fragrance in a closed area to control odors. The apparatus 10 could also be used in a number of different settings which require the automatic dispensing of a precise amount of fluid.

Figure 7:
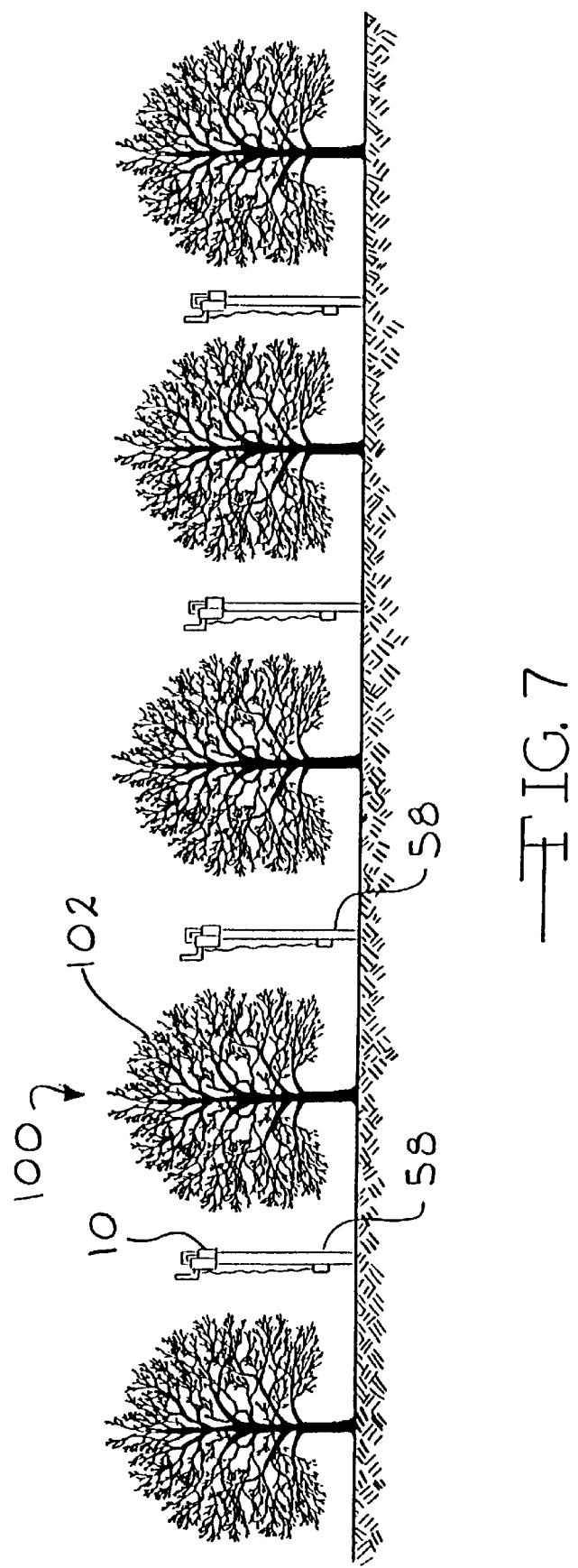
FIG. 7 is a front view showing use of the apparatus 10 in an orchard 100.

To use the apparatus 10 in an outdoor setting, such as an orchard 100, the apparatus 10 is preferably mounted on a pole 58 in the orchard 100 such that the nozzle 28 is essentially level with the middle of the tree (FIGS. 7 to 9). Alternatively, the apparatus 10 can be mounted on a limb of a tree. In the preferred embodiment, there are several apparatuses 10 spaced around the orchard 100. The portability of the apparatus 10 allows for easy positioning of the apparatus 10 as needed for full coverage. The number of apparatuses 10 depends on the amount of chemical 104 dispensed by each apparatus 10 and the size of the area to be covered. Preferably, the apparatus 10 is able to disperse less than 10 μL of chemical 104 and/or chemical 104 and propellant 102 in the container 12 during each pulse. The low volume of dispersion allows the amount of chemical 104 dispersed to be easily limited to very small volumes. This is important in the preferred embodiment due to the cost of the pheromone 104 and the need for only small volumes of the pheromone 104 to achieve insect control. Due to the removability of the nozzle 28, adaptor 18 or 218 and control circuit 34 or 42 from the container 12, the nozzle 28, adaptor 18 or 218 and control circuit 34 or 42 can be reused. In the embodiments having the control circuit 34 or 42 mounted on the electrical connector 31 of the nozzle 28 or on the adaptor 18 or 218, the adaptor 18 or 218 with the nozzle 28 and control circuit 34 or 42 are removed from an empty container 12 as a single unit. They are then reattached to a full container 12. At the end of a season, the apparatuses 10 having the empty containers 12 can be left in the orchard 100 until labor is available and then provided with full containers 12 for the following spring which saves on labor costs. When the apparatuses 10 are connected together and remotely controlled, cables 64 connecting the apparatuses 10 are mounted below the ground or above ground between the poles 58 (FIG. 8). In the alternate embodiment, where the apparatus 10 are radio controlled or controlled by satellite, the control box 35 can be with the apparatus 10 or anywhere else on the pole 58. In the preferred embodiment, the control circuit 34 or 42 is preconfigured so that the apparatus 10 ejects a pulse of the liquid 104 having a set duration with a set time between each pulse. In the alternate embodiments, using radio control or a central computer 62, the control circuits 34 or 42 do not need to be preprogrammed but can be programmed after the apparatuses 10 are in place.

It is intended that the foregoing description be only illustrative of the present invention and that the present invention be limited only by the hereinafter appended claims.

We claim:

1. A dispenser apparatus for periodic, controlled dispensing of a chemical in a liquid form which comprises:
   (a) a disposable sealed container having an orifice and containing a pressurized gas and the chemical in the liquid form;
   (b) adaptor means configured to be sealingly connected to the orifice;
   (c) a fuel injector nozzle sealingly connected to the adaptor means of the container capable of periodically dispensing the chemical in the liquid form by the pressurized gas from the container, wherein the fuel injector nozzle comprises:
      (i) a body with a passage therethrough;
      (ii) a valve needle moveable in the passage of the body to open and close the passage;
      (iii) a solenoid coil with electrical leads to the coil mounted on the body, so that the coil provides a continuous circuit surrounding the valve needle which is moved upon application of a current through the coil; and
      (iv) a bias means mounted in the body which holds the valve needle in a closed position when the current is not applied through the coil; and
   (d) a control means which supplies current to the coil to move the valve needle against the bias means to open the passage in the body of the fuel injector nozzle and allows the chemical in the liquid form to be dispensed periodically from the container through the passage in the body of the fuel injector nozzle, wherein the sealed container is used without refilling and is replaced when empty with a replacement sealed container.

2. The apparatus of claim 1 which is a self-contained unit and is portable.

3. The apparatus of claim 1 wherein the adaptor means is removably connected to the orifice of the container such that the adaptor means is reusable.

4. The apparatus of claim 1 wherein the control means is removably mounted on the fuel injector nozzle and the control means is reusable.

5. The apparatus of claim 1 wherein the control means is mounted on the adaptor means and the control means is reusable.

6. The apparatus of claim 1 wherein the adaptor means has a first end and a second end forming a longitudinal axis of the adaptor means having a center bore extending therebetween, the first end of the adaptor means configured to be connected to the orifice and the second end having a cavity for inserting the body of the fuel injector nozzle to connect the fuel injector nozzle to the orifice.

7. The apparatus of claim 6 wherein a sidewall of the adaptor means surrounding the cavity has a slot extending through the sidewall into the cavity and wherein a lock ring is slid through the slot to engage the body of the fuel injector nozzle to secure the fuel injector nozzle in the cavity of the adaptor means.

8. The apparatus of claim 6 wherein the first end of the adaptor means has a threaded opening extending parallel to the longitudinal axis of the adaptor means and the orifice of the container has a threaded extension which engages the threaded opening of the adaptor means to secure the adaptor means to the container at the orifice.

9. The apparatus of claim 6 wherein the adaptor means has a first portion adjacent the first end having a first section of the center bore and a second portion adjacent the second end having a second section of the center bore wherein an end of the first portion of the adaptor means adjacent the second portion is angled such that a longitudinal axis of the second section of the center bore is at an angle to a longitudinal axis of the first section of the center bore.

10. The apparatus of claim 9 wherein the longitudinal axis of the second section of the center bore is at a 45° angle to the longitudinal axis of the first section of the center bore.

11. The apparatus of claim 1 wherein the control means is a programmable processing unit which periodically activates the control means to supply current to the coil of the fuel injector nozzle to open the needle valve.

12. The apparatus of claim 1 wherein the control means has a remote electromagnetic wave transmitter controlling a receiver connected to the coil of the fuel injector nozzle on the container which when activated by the transmitter allows current to flow to the coil thus moving the needle valve to open the passage in the fuel injector nozzle.

13. The apparatus of claim 12 wherein the transmitter is activated by a central processing unit and wherein the central processing unit is in a programmable computer and the computer contains a program which allows current to periodically flow to the coil to move the valve needle and thus open the passage of the fuel injector nozzle.

14. The apparatus of claim 1 wherein a hook is attached to the adaptor means to allow for attaching the apparatus to a tree.

15. The apparatus of claim 14 wherein the hook is flexible and can be wrapped around a branch of the tree.

16. The apparatus of claim 1 wherein the apparatus dispenses less than 10 $\mu$L of the chemical in liquid form.

17. A dispenser apparatus for periodic controlled dispensing of a chemical in a liquid form which comprises:
(a) a disposable sealed container having an orifice which allows a pressurized gas to be provided in the container, the container being configured to hold the pressurized gas and the chemical in the liquid form;
(b) adaptor means configured to be sealingly connected to the orifice;
(c) a nozzle sealingly connected to the adaptor means for the dispensing, wherein the nozzle comprises:
(i) a body with a passage therethrough;
(ii) a valve needle moveable in the passage of the body to open and close the passage;
(iii) a solenoid coil with electrical leads to the coil mounted on the body, so that the coil provides a continuous circuit surrounding the valve needle which is moved upon application of a current through the coil; and
(iv) a bias means mounted in the body which holds the valve needle in a closed position when the current is not applied through the coil; and
(d) a control means for supplying current to the coil to move the valve needle against the bias means to open the passage in the body of the nozzle and allows the chemical in the liquid form to be dispensed periodically from the container through the passage in the body of the nozzle, wherein the control means is a self-contained circuit which is releasably connected to the nozzle and supplies the current periodically to the coil on a pre-programmed schedule, wherein the sealed container is used without refilling and is replaced when empty with a replacement sealed container.

18. The dispenser apparatus of claim 17 wherein the control means is mounted on the adaptor means and the control means and the adaptor means are an integral unit.

19. The apparatus of claim 17 wherein the circuit has an activated mode which supplies current to the coil and an inactivated mode wherein no current is supplied to the coil.

20. The apparatus of claim 19 wherein the inactivated mode is controlled by a capacitor electrically connected to separate transistor gates, wherein the loss of a charge on the capacitor opens the gate of one of the transistors and allows current to flow from a battery to the coil.

21. The apparatus of claim 17 wherein the control means has a remote electromagnetic wave transmitter controlling a receiver connected to the coil of the nozzle on the container which when activated by the transmitter allows current to flow to the coil thus moving the needle valve to open the passage in the nozzle; wherein the transmitter is activated by a central processing unit; wherein the central processing unit is in a programmable computer; and wherein the computer contains a program which allows current to periodically flow to the coil to move the needle valve and thus open the passage of the nozzle.

22. The apparatus of claim 17 wherein the adaptor means has a first end and a second end forming a longitudinal axis of the adaptor means having a center bore extending therebetween and the first end of the adaptor means configured to be connected to the orifice and the second having a cavity for inserting the body of the nozzle to connect the nozzle to the orifice.

23. The apparatus of claim 22 wherein a sidewall of the adaptor means surrounding the cavity has a slot extending through the sidewall into the cavity and wherein a lock ring is slid through the slot to engage the body of the nozzle to secure the nozzle in the cavity of the adaptor means.

24. The apparatus of claim 22 wherein the adaptor means has a first portion adjacent the first end having a first section of the center bore and a second portion adjacent the second end having a second section of the center bore wherein an end of the first portion of the adaptor means adjacent the second portion is angled such that a longitudinal axis of the second section of the center bore is at an angle to a longitudinal axis of the first section of the center bore.

25. The apparatus of claim 24 wherein the longitudinal axis of the second section of the center bore is at a 45° angle to the longitudinal axis of the first section of the center bore.

26. The apparatus of claim 17 wherein the adaptor means is removably connected to the orifice of the container such that the adaptor means is reusable.

27. The apparatus of claim 17 wherein the control means is removably mounted on the nozzle and the control means is reusable.

28. The apparatus of claim 17 wherein the apparatus dispenses less than 10 $\mu$L of the chemical in liquid form.

29. A system for periodically dispensing a chemical in a liquid form over an area which comprises:
(a) multiple dispenser apparatus containing the chemical in the liquid form, each dispenser apparatus comprising a disposable sealed container having an orifice and containing a pressurized gas and the chemical in the liquid form; adaptor means configured to be sealingly connected to the orifice; a fuel injector nozzle sealingly connected to the adaptor to the orifice of the container and capable of periodically dispensing less than 10 $\mu$L of the chemical in the liquid form by the pressurized gas, wherein the fuel injector nozzle comprises:
(i) a body with a passage therethrough;
(ii) a valve needle moveable in the passage of the body to open and close the passage;
(iii) a solenoid coil with electrical leads to the coil mounted on the body so that the coil provides a continuous circuit surrounding the valve needle so that the needle is moved upon application of a current through the coil; and
(iv) bias means mounted in the body which holds the valve needle in a closed position when the current is not flowing through the coil;
(b) control means which supplies current to the coil to move the valve needle against the bias means to open the passage in the fuel injector nozzle and allows the chemical in the liquid form and the gas to be dispensed periodically from the container through the passage in the body of the fuel injector nozzle; and
(c) a central processing unit as part of the control means which controls each of the multiple dispenser apparatus so that each dispenser apparatus periodically dispenses the chemical in the liquid form from the fuel injector nozzle, wherein the sealed container is used without refilling and is replaced when empty with a replacement sealed container.

30. The system of claim 29 wherein each of the dispenser apparatus can be provided at different positions in the area and be controlled by the processing unit.

31. The system of claim 29 wherein the central processing unit of the control means is connected to an electromagnetic wave transmitter controlling a receiver connected to the coil of the fuel injector nozzle on each container which when activated by the transmitter allows the current to flow to the coil thus moving the needle valve to open the passage in the fuel injector nozzle.

32. The system of claim 29 wherein the adaptor means has a first end and a second end forming a longitudinal axis of the adaptor means having a center bore extending therebetween and the first end of the adaptor means configured to be connected to the orifice and the second having a cavity for inserting the body of the fuel injector nozzle to connect the fuel injector nozzle to the orifice.

33. The system of claim 32 wherein a sidewall of the adaptor means surrounding the cavity has a slot extending through the sidewall into the cavity and wherein a lock ring is slid through the slot to engage the body of the fuel injector nozzle to secure the fuel injector nozzle in the cavity of the adaptor means.

34. A method for dispensing a chemical in a liquid form which comprises the steps of:
  (a) providing a dispenser apparatus comprising a disposable sealed container having an orifice which allows a pressurized gas to be provided in the container means and which can hold the pressurized gas and the chemical in the liquid form; adaptor means configured to be connected to the orifice; a fuel injector nozzle connected to the adaptor means of the container capable of periodically dispensing less than 10 μL of the chemical in the liquid form by the pressurized gas, wherein the fuel injector nozzle comprises:
    (i) a body with a passage therethrough;
    (ii) a valve needle moveable in the passage of the body to open and close the passage;
    (iii) a solenoid coil with electrical leads to the coil mounted on the body so that the coil provides a continuous circuit surrounding the valve needle which is moved upon application of a current through the coil; and
    (iv) bias means mounted in the body which holds the valve needle in a closed position when the current is not flowing through the coil; and
  control means for controlling the fuel injector nozzle; and
  (b) activating the apparatus such that the control means supplies current to the coil to move the valve needle against the bias means to open the passage in the fuel injector nozzle so that the chemical in the liquid form and the pressurized gas are dispensed periodically from the container through the passage in the body of the fuel injector nozzle, wherein the sealed container is used without refilling and is replaced when empty with a replacement sealed container.

35. The method of claim 34 wherein the adaptor means is removably connected to the orifice of the container and the control means is removably mounted on and releasably connected to the fuel injector nozzle such that in step (b) after all of the chemical in the liquid form has been dispensed from the container, the adaptor means, fuel injector nozzle and the control means are removed from the container and connected to a full container.

36. The method of claim 34 wherein the control means is a programmable processing unit which periodically activates the control means to supply current to the coil of the fuel injector nozzle to open the valve needle.

37. The method of claim 34 wherein the control means has a remote electromagnetic wave transmitter controlling a receiver connected to the coil of the fuel injector nozzle on the container which when activated by the transmitter allows current to flow to the coil thus moving the needle valve to open the passage in the fuel injector nozzle.

38. The method of claim 37 wherein the transmitter is activated by a central processing unit.

39. The method of claim 34 wherein the chemical in the liquid form is a pheromone which attracts insects which is dispensed in an area containing plants attacked by the insect to confuse the insects and prevent mating.

40. The method of claim 34 wherein the chemical in the liquid form is a fragrance which is dispensed in a closed area to control odors.

41. A method for dispensing a chemical in a liquid form which comprises the steps of:
  (a) providing a dispenser apparatus comprising a disposable sealed container having an orifice and which can hold a pressurized gas and the chemical in the liquid form; adaptor means configured to be sealingly connected to the orifice; a nozzle sealingly configured to be connected to the adaptor means of the container, wherein the nozzle comprises:
    (i) a body with a passage therethrough;
    (ii) a valve needle moveable in the passage of the body to open and close the passage;
    (iii) a solenoid coil with electrical leads to the coil mounted on the body so that the coil provides a continuous circuit surrounding the valve needle which is moved upon application of a current through the coil; and
    (iv) bias means mounted in the body which holds the valve needle in a closed position when the current is not flowing through the coil;
  self-contained circuit mounted on the container for controlling the nozzle; and
  (b) activating the apparatus so that the self-contained circuit supplies current periodically to the coil on a pre-programmed schedule to move the valve needle against the bias means to open the passage in the nozzle so that the chemical in the liquid form and the pressurized gas are dispensed periodically from the container through the passage in the body of the nozzle.

42. The method of claim 41 wherein the circuit has an activated mode which supplies current to the coil and an inactivated mode where no current is supplied by the circuit.

43. The method of claim 42 wherein the inactivated mode is controlled by a capacitor electrically connected to separate gates of transistors, wherein the loss of a charge on the capacitor opens the gate of one of the transistors and allows current to flow from a battery to the coil.

* * * * *